United States Patent [19]
Rentschler et al.

[11] Patent Number: 5,920,326
[45] Date of Patent: *Jul. 6, 1999

[54] CACHING AND COHERENCY CONTROL OF MULTIPLE GEOMETRY ACCELERATORS IN A COMPUTER GRAPHICS SYSTEM

[75] Inventors: Eric Rentschler; Alan S. Krech, Jr.; Kendall F Tidwell, all of Ft. Collins, Colo.

[73] Assignee: Hewlett Packard Company, Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/865,903

[22] Filed: May 30, 1997

[51] Int. Cl.⁶ ...................................................... G06F 15/16
[52] U.S. Cl. ............................................ 345/503; 345/506
[58] Field of Search .................................... 345/502–503, 345/505, 506, 501

[56] References Cited

U.S. PATENT DOCUMENTS 5,720,019  2/1998  Koss et al. ............................... 345/434
5,757,385  5/1998  Narayanaswami et al. ............ 345/505

Primary Examiner—Kee M. Tung

[57] ABSTRACT

A computer graphics system for rendering graphics primitives based upon primitive data received from a host computer through a graphics interface. The primitive data may include vertex state and property state values. The computer graphics system includes a plurality of geometry accelerators configured to process the primitive data to render graphics primitives. The graphics primitives are rendered from one or more vertex states in accordance with the property states currently maintained in the rendering geometry accelerator. A distributor divides the primitive data into chunks of primitive data and distributes each of the primitive data chunks to a current geometry accelerator recipient. In one aspect of the invention, the distributor includes a state controller interposed between the host computer and said plurality of geometry accelerators. The state controller is configured to store and resend selected primitive data to the plurality of geometry accelerators based upon whether the one or more vertices of a graphics primitive are contained in more than one of the chunks of primitive data. A driver, based upon the occurrence of function calls that cause certain dependent property states to have values determined by the value assigned to a determining property state, controls the state controller to provide values of the determining property state to the geometry accelerators for values of said deponent property states.

20 Claims, 28 Drawing Sheets

FIG. 5

| Vertex State Register Contents ||
| Contents | Size |
| --- | --- |
| x | 1 word |
| y | 1 word |
| z | 1 word |
| w | 1 word |
| Total | 4 words |

FIG. 6

| Global State Register Contents | | | | |
|---|---|---|---|---|
| Global State | | Contents | Size (words) | Coherency Dirty Bit |
| Front Face | Ambient | r, g, b | 3 | 1 |
| | Diffuse | r, g, b, α | 4 | 1 |
| | Specular | r, g, b | 3 | 1 |
| | Emissive | r, g, b | 3 | 1 |
| | Shininess | floating point/ integer | 1 | 1 |
| | Specular Threshold | floating point/ integer | 1 | 1 |
| Back Face | Ambient | r, g, b | 3 | 1 |
| | Diffuse | r, g, b, α | 4 | 1 |
| | Specular | r, g, b | 3 | 1 |
| | Emissive | r, g, b | 3 | 1 |
| | Shininess | floating point/ integer | 1 | 1 |
| | Specular Threshold | floating point/ integer | 1 | 1 |
| Other | Separate Specular | r, g, b | 3 | 1 |
| | DC Fog | - | 1 | 1 |
| Total | | | 34 | 14 |

FIG. 7

| \multicolumn{5}{c|}{Local State Register Contents} |

| States | Contents | Type | Size | Coherency Dirty Bit |
|---|---|---|---|---|
| Normal | x | Floating Point | 1 word | 1 |
|  | y | Floating Point | 1 word |  |
|  | z | Floating Point | 1 word |  |
| Color | r | Floating Point | 1 word | 1 |
|  | g | Floating Point | 1 word |  |
|  | b | Floating Point | 1 word |  |
|  | α | Floating Point | 1 word |  |
| Texture Coordinates | s | Floating Point | 1 word | 1 |
|  | t | Floating Point | 1 word |  |
|  | r | Floating Point | 1 word |  |
|  | q | Floating Point | 1 word |  |
| Edge Flag | flag | Bit | 1 bit | 1 |
| Total |  |  | 11 words + 1 bit | 4 bits |

FIG. 8

Maintenance of Graphics State Memory

| Primitive Type | Vertex State | | Global State | | Local State | |
|---|---|---|---|---|---|---|
| | Master State Memory | Slave State Memory | Master State Memory | Slave State Memory | Master State Memory | Slave State Memory |
| Point | Not required to be stored in the graphics state memory. | Not required to be stored in the graphics state memory. | Not required to be stored in the graphics state memory. | Not required to be stored in the graphics state memory. | | Not required to be transferred to slave state memory. |
| Line | | | | | | |
| Quadrilateral | | | | | | |
| Triangle | | | | | | |
| Line Strip | Update when a new vertex is received. | | Update when a new global state is received. | | Update when a new local state is received. | |
| Quadrilateral Strip | | Master to slave transfer when a vertex is received, except for the last vertex of a chunk. | | Master to slave transfer when a vertex is received except for the last vertex of a chunk. | | Master to slave transfer when a vertex is received, except for the last vertex of a chunk. |
| Triangle Strip | | | | | | |
| Polygon | | Master to slave transfer when first vertex after a glBegin() is received. | | Master to slave transfer when first vertex after a glBegin() is received. | | Master to slave transfer when first vertex after a glBegin() is received. |
| Triangle Fan | | | | | | |
| Line Loop | | | | | | |

FIG. 9

| Maintenance of Coherency Control Registers | | | |
|---|---|---|---|
| Primitive | Global State Dirty Bits | Local State | |
| | | Dirty Vectors | Dirty Bits |
| Point | Not utilized. | Set all bits except that of the current geometry accelerator when any new LS is received.<br><br>Clear bit when that geometry accelerator is updated after an EOC. | Not utilized. |
| Line | | | |
| Quadrilateral | | | |
| Triangle | | | |
| Line Strip | | | |
| Quadrilateral Strip | Set when new GS is received.<br><br>Clear on each vertex except the last vertex before an EOC and on a glEnd(). | | Set when new LS is received.<br><br>Clear on each vertex except last vertex before EOC. |
| Triangle Strip | | | |
| Polygon | Set when new GS is received.<br><br>Clear when the first vertex after a glBegin() is received and on a glEnd(). | | Set when new LS is received.<br><br>Clear on first vertex after a glBegin(). |
| Triangle Fan | | | |
| Line Loop | | | |

FIG. 12

| REGISTER | BIT RANGE | | | |
|---|---|---|---|---|
| | 31:24 | 23:16 | 15:8 | 7:0 |
| VPC_0 | LINE STRIP | LINE LOOP | LINES | POINTS |
| VPC_1 | QUADS | TRIANGLE FANS | TRIANGLE STRIP | TRIANGLES |
| VPC_2 | RESERVED | RESERVED | POLYGONS | QUAD STRIPS |

VERTICES-PER-CHUNK REGISTERS 1202

STATE REGISTERS 410

FIG. 13

| Resend Global State, Local State and Vertex State Actions for Points, Lines, Quads and Triangles after an EOC | | | |
|---|---|---|---|
| Primitive | When | Resend | Contains |
| Point | Corresponding bit of the LS dirty vector 1104 is set. | Contents of corresponding LS register contents 430 in master state memory 420. | LS(n-1) |
| Line | | | |
| Quadrilateral | | | |
| Triangle | | | |

FIG. 14

| Resend Global State, Local State and Vertex State Actions for Line Strips and Line Loops after an EOC | | | |
|---|---|---|---|
| Order | When | Resend | Contains |
| 1 | Corresponding bit of the LS dirty vector 1104 is set. | Contents of corresponding LS register 430 in master state memory 420. | LS(n-1) |
| 2 | Always. | Contents of vertex state register 426 in master state memory 420. | VS(n-1) |

FIG. 15

| Resend Global State, Local State and Vertex State Actions for Triangle Strips and Quadrilateral Strips after an EOC | | | |
|---|---|---|---|
| Order | When | Resend | Contains |
| 1 | Any GS dirty bit 1002 is set. | Contents of corresponding GS state register 434 in slave state memory 422. | GS(n-2) |
| 2 | Corresponding bit of the LS dirty vector 1004 is set and when LS dirty bit 1102 is not set. | Contents of corresponding LS state register 430 in master state memory 420. | LS(n-1) |
| | When any LS dirty bit 1102 is set. | Contents of corresponding LS state register 436 in slave state memory 422. | LS(n-2) |
| 3 | Always. | Contents of VS state register 432 in slave state memory 422. | VS(n-2) |
| 4 | Any GS dirty bit 1002 is set. | Contents of corresponding GS state register 428 in master state memory 420. | GS(n-1) |
| 5 | When any LS dirty bit 1102 is set. | Contents of corresponding LS state register 430 in master state memory 420. | LS(n-1) |
| 6 | Always. | Contents of VS state register 426 in master state memory 420. | VS(n-1) |

FIG. 16

| | Resend Global State, Local State and Vertex State Actions for Polygons and Triangle Fans after an EOC | | |
|---|---|---|---|
| Order | When | Resend | Contains |
| 1 | Any GS dirty bit 1002 is set. | Contents of corresponding GS state register contents 434 in slave state memory 422. | GS(0) |
| 2 | The corresponding bit of the LS dirty vector 604 is set and LS dirty bit 1102 is not set. | Contents of corresponding LS state register 430 in master state memory 420. | LS(n-1) |
| | When any LS dirty bit 1102 is set. | Contents of corresponding LS state register 430 in slave state memory 422. | LS(0) |
| 3 | Always | Contents of VS state register 432 in slave state memory 422. | VS(0) |
| 4 | Any GS dirty bit 1102 is set. | Contents of corresponding GS state register 428 in master state memory 420. | GS(n-1) |
| 5 | When any LS dirty bit 1102 is set. | Contents of corresponding LS state register 430 in master state memory 420. | LS(n-1) |
| 6 | Always | Contents of VS state register 432 in slave state memory 422. | VS(n-1) |

FIG. 17

| Resend Global State, Local State and Vertex State Actions for Line Loops before a glEnd() | | | |
|---|---|---|---|
| Order | When | Resend | Contains |
| 1 | Any GS dirty bit 1102 is set. | Contents of corresponding GS state register 434 in slave state memory 422. | GS(0) |
| 2 | Any LS dirty bit 1102 is set. | Contents of corresponding LS state register 434 in slave state memory 422. | LS(0) |
| 3 | Always. | Contents of VS state register 432 in slave state memory 422. | VS(0) |
| 4 | Any GS dirty bit 1102 is set. | Contents of corresponding GS state register 428 in master state memory 422. | GS(n-1) |
| 5 | Any LS dirty bit 1102 is set. | Contents of corresponding LS state register 430 in master state memory 422. | LS(n-1) |

FIG. 18A

| | Example of Changes in Local State for Triangle Strips | | | | | |
|---|---|---|---|---|---|---|
| Step | From Host | To GAs | Current GA | Local State Coherency | | Vertex Count |
| | | | | Dirty Vector | Dirty Bits | |
| X | LS(X) | LS(X) | 1 | 1101 | X | X |
| . | . | . | . | . | . | . |
| . | . | . | . | . | . | . |
| 1 | glBegin (GL_TRIANGLE_STRIP) | glBegin (GL_TRIANGLE_STRIP) | 1 | 1101 | X | 0 |
| 2 | VS(0) | VS(0) | 1 | 1101 | 0 | 1 |
| 3 | VS(1) | VS(1) | 1 | 1101 | 0 | 2 |
| 4 | VS(2) | VS(2) | 1 | 1101 | 0 | 3 |
| 5 | VS(3) | VS(3) | 1 | 1101 | 0 | 4 |
| 6 | VS(4) | VS(4) | 1 | 1101 | 0 | 5 |
| 7 | VS(5) | VS(5) | 1 | 1101 | 0 | 6 |
| 8 | | EOC | 2 | 1101 | 0 | 0 |
| 9 | | EOC | 3 | 1101 | 0 | 0 |
| 10 | VS(6) | LS(X) | 3 | 0101 | 0 | 0 |
| 11 | | VS(4) | 3 | 0101 | 0 | 1 |
| 12 | | VS(5) | 3 | 0101 | 0 | 2 |
| 13 | | VS(6) | 3 | 0101 | 0 | 3 |
| 14 | VS(7) | VS(7) | 3 | 0101 | 0 | 4 |

FIG. 18B

| | Example of Changes in Local State for Triangle Strips | | | | | |
|---|---|---|---|---|---|---|
| Step | From Host | To GAs | Current GA | Local State Coherency | | Vertex Count |
| | | | | Dirty Vector | Dirty Bits | |
| 15 | VS(8) | VS(8) | 3 | 0101 | 0 | 5 |
| 16 | LS(9) | LS(9) | 3 | 0111 | 1 | 5 |
| 17 | VS(9) | VS(9) | 3 | 0111 | 1 | 6 |
| 18 | | EOC | 0 | 0111 | 1 | 0 |
| 19 | | LS(X) | 0 | 0111 | 1 | 0 |
| 20 | | VS(8) | 0 | 0111 | 1 | 1 |
| 21 | VS(10) | LS(9) | 0 | 0110 | 1 | 1 |
| 22 | | VS(9) | 0 | 0110 | 1 | 2 |
| 23 | | VS(10) | 0 | 0110 | 1 | 3 |
| 24 | VS(11) | VS(11) | 0 | 0110 | 1 | 4 |
| 25 | glEnd() (GL_TRIANGLE_STRIP) | glEnd() (GL_TRIANGLE_STRIP) | 0 | 0110 | 1 | 4 |

FIG. 19

| | Exemplary Lines Sequence | | |
|---|---|---|---|
| Steps | From Host | To GAs | Line (Fig. 3B) |
| 1 | glBegin(GL_LINES) | glBegin(GL_LINES) | |
| 2 | GS(0) | GS(0) | Line 303A |
| 3 | LS(0) | LS(0) | |
| 4 | VS(0) | VS(0) | |
| 5 | GS(1) | GS(1) | |
| 6 | LS(1) | LS(1) | |
| 7 | VS(1) | VS(1) | |
| 8 | GS(2) | EOC | |
| 9 | | LS(1) | Line 303B |
| 10 | | GS(2) | |
| 11 | LS(2) | LS(2) | |
| 12 | VS(2) | VS(2) | |
| 13 | GS(3) | GS(3) | |
| 14 | LS(3) | LS(3) | |
| 15 | VS(3) | VS(3) | |
| 16 | GS(4) | GS(4) | Line 303C |
| 17 | LS(4) | LS(4) | |
| 18 | VS(4) | VS(4) | |
| 19 | GS(5) | GS(5) | |
| 20 | LS(5) | LS(5) | |
| 21 | VS(5) | VS(5) | |
| 22 | glEnd(GL_LINES) | glEnd(GL_LINES) | |

FIG. 20A

| | Exemplary Quadrilateral Strip Sequence | | |
|---|---|---|---|
| Steps | From Host | To GAs | Quadrilaterals (Fig. 3G) |
| 1 | glBegin(GL_QUAD_STRIP) | glBegin(GL_QUAD_STRIP) | |
| 2 | GS(0) | GS(0) | |
| 3 | LS(0) | LS(0) | |
| 4 | VS(0) | VS(0) | |
| 5 | GS(1) | GS(1) | |
| 6 | LS(1) | LS(1) | |
| 7 | VS(1) | VS(1) | |
| 8 | GS(2) | GS(2) | QUAD 313A |
| 9 | LS(2) | LS(2) | |
| 10 | VS(2) | VS(2) | |
| 11 | GS(3) | GS(3) | |
| 12 | LS(3) | LS(3) | QUAD 313B |
| 13 | VS(3) | VS(3) | |
| 14 | GS(4) | GS(4) | |
| 15 | LS(4) | LS(4) | |
| 16 | VS(4) | VS(4) | |
| 17 | GS(5) | GS(5) | |
| 18 | LS(5) | LS(5) | |
| 19 | VS(5) | VS(5) | |

FIG. 20B

| Exemplary Quadrilateral Strip Sequence ||||
| Steps | From Host | To GAs | Quadrilaterals (Fig. 3G) ||
|---|---|---|---|---|
| 20 | GS(6) | EOC | | |
| 21 | | GS(4) | | |
| 22 | | LS(4) | | |
| 23 | | VS(4) | | |
| 24 | | GS(5) | | |
| 25 | | LS(5) | | |
| 26 | | VS(5) | | |
| 27 | | GS(6) | QUAD 313C | |
| 28 | LS(6) | LS(6) | | |
| 29 | VS(6) | VS(6) | | |
| 30 | GS(7) | GS(7) | | |
| 31 | LS(7) | LS(7) | | |
| 32 | VS(7) | VS(7) | | |
| 33 | glEnd(GL_QUAD_STRIP) | glEnd(GL_QUAD_STRIP) | | |

FIG. 21A

| Exemplary sequence of OpenGL commands illustrating state linking (Table 1 of 2) | | | |
|---|---|---|---|
| Step | From Host | To GAs | GA State |
| 1 | glColorMaterial (GL_FRONT, GL_EMISSION) | glColorMaterial (GL_FRONT, GL_EMISSION) | GA1 Color = prior color<br>GA1 Front facing emissive = prior color |
| 2 | glEnable (GL_COLOR_MATERIAL) | glEnable (GL_COLOR_MATERIAL) | GA1 Color = prior color<br>GA1 Front facing emissive = prior color |
| 3 | glBegin (GL_LINES) | glBegin (GL_LINES) | GA1 Color = prior color<br>GA1 Front facing emissive = prior color |
| 4 | glColor ("blue") | glColor ("blue") | GA1 Color = blue<br>GA1 Front facing emissive = prior color |
| 5 | | glMaterial (GL_FRONT, GL_EMISSION, blue) | GA1 Color = blue<br>GA1 Front facing emissive = blue |
| 6 | glVertex() | VS(0) | GA1 Color = blue<br>GA1 Front facing emissive = blue |
| 7 | glColor ("red") | glColor ("red") | GA1 Color = red<br>GA1 Front facing emissive = blue |
| 8 | | glMaterial (GL_FRONT, GL_EMISSION, red) | GA1 Color = red<br>GA1 Front facing emissive = red |
| 9 | glVertex() | VS(1) | GA1 Color = red<br>GA1 Front facing emissive = red |

FIG. 21B

Exemplary sequence of OpenGL commands illustrating state linking (Table 2 of 2)

| Step | From Host | To GAs | GA State |
|---|---|---|---|
| 10 | glEnd() | glEnd() | GA1 Color = red<br>GA1 Front facing emissive = red |
| 11 | glDisable<br>(GL_COLOR_MATERIAL) | glDisable<br>(GL_COLOR_MATERIAL) | GA1 Color = red<br>GA1 Front facing emissive = red |
| 12 | glBegin (GL_LINES) | glBegin (GL_LINES) | GA1 Color = red<br>GA1 Front facing emissive = red |
| 13 | glVertex() | VS(0) | GA1 Color = red<br>GA1 Front facing emissive = red |
| 14 | glVertex() | VS(1) | GA1 Color = red<br>GA1 Front facing emissive = red |
| 15 | glVertex() | EOC | GA2 Color = prior color<br>GA2 Front facing emissive = prior color |
| 16 | | glColor ("red") | GA2 Color = red<br>GA2 Front facing emissive = prior color |
| 17 | | VS(2) | GA2 Color = red<br>GA2 Front facing emissive = prior color |

FIG. 22

| Linked State Register 2200 ||||||  |
| --- | --- | --- | --- | --- | --- | --- |
| Bits |||||| Material State That is Mapped to glColor() |
| 05 | 04 | 03 | 02 | 01 | 00 | |
| Front Face | Back Face | Ambient | Diffuse | Specular | Emission | |
| 0 | 0 | X | X | X | X | Nothing |
| 0 | 1 | 0 | 0 | 0 | 1 | Back Facing Emission |
| 0 | 1 | 0 | 0 | 1 | 0 | Back Facing Specular |
| 0 | 1 | 0 | 1 | 0 | 0 | Back Facing Diffuse |
| 0 | 1 | 1 | 0 | 0 | 0 | Back Facing Ambient |
| 0 | 1 | 1 | 1 | 0 | 0 | Back Facing Ambient and Diffuse |
| 1 | 0 | 0 | 0 | 0 | 1 | Front Facing Emission |
| 1 | 0 | 0 | 0 | 1 | 0 | Front Facing Specular |
| 1 | 0 | 0 | 1 | 0 | 0 | Front Facing Diffuse |
| 1 | 0 | 1 | 0 | 0 | 0 | Front Facing Ambient |
| 1 | 0 | 1 | 1 | 0 | 0 | Front Facing Ambient and Diffuse |
| 1 | 1 | 0 | 0 | 0* | 1 | Front and Back Facing Emission |
| 1 | 1 | 0 | 0 | 1 | 0 | Front and Back Facing Specular |
| 1 | 1 | 0 | 1 | 0 | 0 | Front and Back Facing Diffuse |
| 1 | 1 | 1 | 0 | 0 | 0 | Front and Back Facing Ambient |
| 1 | 1 | 1 | 1 | 0 | 0 | Front and Back Facing Ambient and Diffuse |

CACHING AND COHERENCY CONTROL OF MULTIPLE GEOMETRY ACCELERATORS IN A COMPUTER GRAPHICS SYSTEM

BACKGROUND OF THE INVENTION

1. Field of The Invention

The present invention relates generally to computer graphics and animation systems and, more particularly, to graphics rendering hardware.

2. Related Art

Computer graphics systems are commonly used for displaying two- and three-dimensional graphics representations of objects on a two-dimensional video display screen. Current computer graphics systems provide highly detailed representations and are used in a variety of applications.

In a typical computer graphics system an object or model to be represented on the display screen is broken down into graphics primitives. Primitives are basic components of a graphics display and may include, for example, points, lines, quadrilaterals, triangle strips and polygons. Typically, a hardware/software scheme is implemented to render, or draw, the graphics primitives that represent a view of one or more objects being represented on the display screen.

Generally, the primitives of the three-dimensional object to be rendered are defined by a host computer in terms of primitive data. For example, when the primitive is a triangle, the host computer may define the primitives in terms of the X, Y, Z and W coordinates of its vertices, as well as the red, green and blue and alpha (R, G, B and α) color values of each vertex. Additional primitive data may be used in specific applications. Rendering hardware interpolates the primitive data to compute the display screen pixels that represent each primitive, and the R, G and B color values for each pixel.

The basic components of a computer graphics system typically include a geometry accelerator, a rasterizer and a frame buffer. The system may also include other hardware such as texture mapping hardware. The geometry accelerator receives primitive data from the host computer that defines the primitives that make up the model view to be displayed. The geometry accelerator performs transformations on the primitive data and performs such functions as lighting, clipping and plane equation calculations for each primitive. The output of the geometry accelerator, referred to as rendering data, is used by the rasterizer and the texture mapping hardware to generate final screen coordinate and color data for each pixel in each primitive. The pixel data from the rasterizer and the pixel data from the texture mapping hardware, if available, are combined and stored in the frame buffer for display on the video display screen.

The volume of data transferred through the host computer and the graphics hardware is extremely large. For example, the data for a single quadrilateral may be on the order of 64 words of 32 bits each. As a result, various techniques have been employed to improve the performance of graphics systems. Due to the large number of at least partially independent operations which are performed in rendering a graphics image, proposals have been made to use some form of parallel architecture for graphics systems. One common approach to achieving parallelism in computer graphics processing is a technique known as pipelining. In such an approach, the individual processors are, in effect, connected in series in an assembly-line configuration. One processor performs a first set of operations on one chunk of data, and then passes that chunk along to another processor which performs a second set of operations, while at the same time the first processor performs the first set of operations again on another chunk of data.

In addition to providing parallelism among the graphics system subsystems, approaches to achieving parallelism within each of the subsystems is also desirable. One such subsystem that has received recent attention is the geometry accelerator because the operations of the geometry accelerator are highly computationally intensive. One frame of a three-dimensional graphics display may include on the order of hundreds of thousands of primitives. To achieve state-of-the-art performance, the geometry accelerator may be required to perform several hundred million floating point calculations per second.

Although the above parallelism is provided with the intent of increasing performance, considerable processing and communication bandwidth is dedicated to providing the parallel geometry accelerators with the necessary primitive data to enable individual geometry accelerators to properly render the primitives. This presents the graphics system designer with many tradeoffs with respect to how the primitive data is distributed in a multiple geometry accelerator architecture.

SUMMARY OF THE INVENTION

The present invention includes a computer graphics system for rendering graphics primitives based upon primitive data received from a host computer through a graphics interface. The primitive data may include vertex state and property state values. The computer graphics system includes a plurality of geometry accelerators configured to process the primitive data to render graphics primitives. The graphics primitives are rendered from one or more vertex states in accordance with the property states currently maintained in the rendering geometry accelerator. A distributor divides the primitive data into chunks of primitive data and distributes each of the primitive data chunks to a current geometry accelerator recipient. In one aspect of the invention, the distributor includes a state controller interposed between the host computer and the plurality of geometry accelerators. The state controller is configured to store and resend selected primitive data to the plurality of geometry accelerators based upon whether the one or more vertices of a graphics primitive are contained in more than one of the chunks of primitive data. A driver configured to control the state controller to set a value of a dependent property state to a value of a determining property state. The driver also forwards the value of the dependent property state to one or more of the plurality of geometry accelerators. Preferably, the driver controls the state machine upon the occurrence of function calls that cause the dependent property state to have a value determined by the value assigned to the determining property state.

In one embodiment, the driver controls the distribution of the property state values through writes to a linked state register stored in the state controller. The linked state register identifies which property states are dependent and which are determining property states.

In another embodiment, the driver is located on the host computer and provides an standardized interface to graphics applications on the host computer and converts standard calls specified by the API to access the graphics system to communications to render three-dimensional images using the graphics system of the present invention.

In another embodiment of the invention, the state controller resends the geometry accelerators any of the dependent states that have changed due to being linked with a previous determining state. Preferably, the state controller updates the values of those same dependent states with the values of the determining property state. Advantageously, this insures the coherency of the geometry accelerators and state controller. When a new color is received, the state controller updates the values of the currently-linked material states as appropriate.

In another embodiment, the driver discards function calls to change currently dependent properties to insure the property linking takes precedence.

In another aspect of the present invention, a method for rendering graphics primitives based upon primitive data, including vertex states and property states, received from a host computer through a graphics interface in a computer graphics system is disclosed. The method includes the steps of: (a) receiving primitive data from the host computer; (b) dividing the primitive data into chunks of primitive data; (c) distributing each of the chunks of primitive data to a current geometry accelerator recipient; (d) processing the primitive data to render graphics primitives from one or more vertex states in accordance with said property states currently-maintained in each said geometry accelerator; and (e) distributing values of a determining property state to one or more of the geometry accelerators for a value of a depending property state which depends from the determining property state.

In one embodiment of this aspect of the invention, the step (e) includes the steps of: (1) determining whether a linked state mode of operation has been invoked by a graphics application; (2) determining which property state is the determining property state and which property state is a dependent property state; and (3) forwarding values of the determining property state to the geometry accelerators for the values of the dependent property states.

In a preferred embodiment, the method also includes the step of: (d) performing a register write operation to a linked state register in the state controller to identify the dependent property states and the determining property states.

In one embodiment, the step (e)(2) comprises the steps of: a) resending previously-linked dependent state values with the value of the determining property state; b) copying to any dependent property state master registers based on the linking established in step (e)(1); and c) updating the linked state register in accordance with the linking established in step (e)(1). Advantageously, this eliminates any concurrency errors that may have been introduced into the system due to the mapping of local and global states.

In another embodiment, the method includes the step of: (f) updating the dependent property state based upon the contents of the linked state register when the value of the determining property value is changed.

In another embodiment, the driver performs the steps of: (g) filtering requests to directly change the value of the dependent state.

Advantageously, the present invention minimizes the bandwidth associated with the linking of property states and does so with a single write command to a register in the state controller. Furthermore, the present invention insures that all of the geometry accelerators maintain current values for all linked properties and do not become dated.

Another advantage of the present invention is that the functionality is distributed across hardware and software, optimizing the advantages of each implementation. For example, filtering of the function calls to independently change dependent property values is filtered by the driver rather than the state controller. This eliminates the need to provide dedicated hardware to perform such a function.

Further features and advantages of the present invention as well as the structure and operation of various embodiments of the present invention are described in detail below with reference to the accompanying drawings. In the drawings, like reference numerals indicate like or functionally similar elements. Additionally, the left-most one or two digits of a reference numeral identifies the drawing in which the reference numeral first appears.

BRIEF DESCRIPTION OF THE DRAWINGS

This invention is pointed out with particularity in the appended claims. The above and further advantages of this invention may be better understood by referring to the following description when taken in conjunction with the accompanying drawings, in which:

FIG. 5 is a table identifying the contents of the vertex state registers of the graphics state memory configured in accordance with the present invention;

FIG. 6 is a table of the global state registers of the graphics state memory configured in accordance with the present invention;

FIG. 7 is a table of the local state registers of the graphics state memory configured in accordance with the present invention;

FIG. 8 is a table, summarizing the functions performed by the GA state controller of the present invention to maintain the graphics state memory illustrated in FIG. 4;

FIG. 9 is a table summarizing the functions performed by the GA state controller of the present invention to maintain the coherent control registers illustrated in FIG. 4;

FIG. 12 is a schematic block diagram of one embodiment of the vertices-per-chunk state registers of the present invention illustrated in FIG. 4;

FIG. 13 is a table illustrating the resend global state, local state and vertex state actions for point, line, quadrilateral and triangle after an End-Of-Chunk (EOC) command;

FIG. 14 is a table illustrating the resend global state, local state and vertex state actions for line strip and line loop primitive types after an EOC command;

FIG. 15 is a table illustrating the resend global state, local state and vertex state actions for quadrilateral strip and triangle strip primitive types after an EOC command;

FIG. 16 is a table illustrating the resend global state, local state and vertex state actions for polygon and triangle fan primitive types after an EOC command;

FIG. 17 is a table illustrating the resend global state, local state and vertex state actions for line loop primitive types before a glEnd() command;

FIGS. 18A and 18B are a table illustrating an exemplary primitive sequence to create a triangle strip wherein the local state is altered during the sequence;

FIG. 19 is a table illustrating an exemplary line sequence to create the lines illustrated in FIG. 3B;

FIGS. 20A and 20B are a table illustrating an exemplary quadrilateral strip sequence to create the quadrilaterals illustrated in FIG. 3G;

FIGS. 21A–21B are an exemplary sequence of OpenGL commands illustrating the problems associated with the linking of local and global states;

FIG. 22 is an illustration of one embodiment of the linked state register bits in tabular format;

DETAILED DESCRIPTION

A. Graphics System

Figure 1:
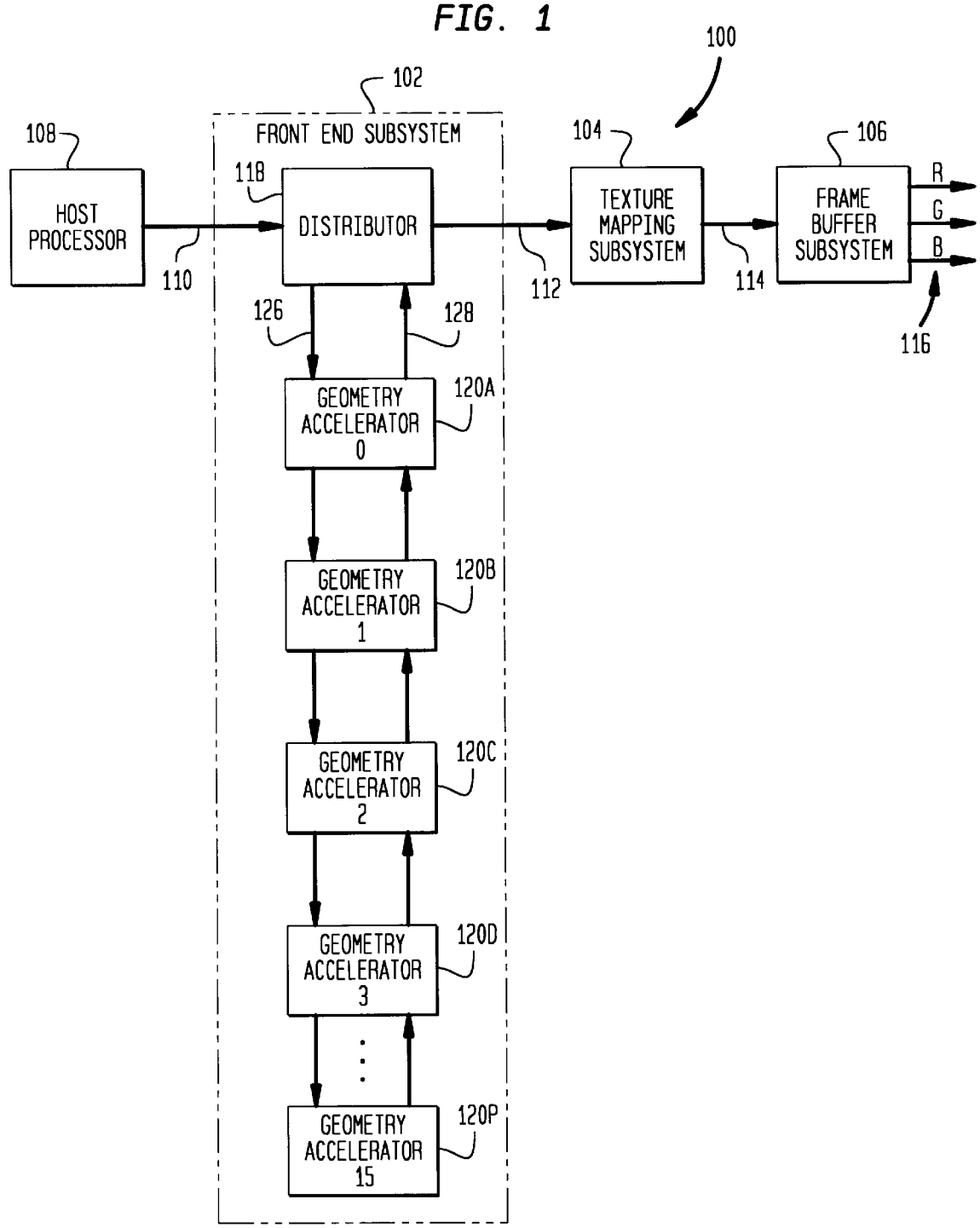
FIG. 1 is a block diagram of an exemplary computer graphics system incorporating the distributor and geometry accelerator state controller of the present invention.

FIG. 1 is a block diagram of an exemplary computer graphics system 100 suitable for incorporation of the distributor and geometry accelerator state controller of the present invention. As shown, the system 100 includes a front-end subsystem 102, a texture mapping subsystem 104 and a frame buffer subsystem 106. The front-end subsystem 102 receives primitives to be rendered from the host computer 108 over bus 10. The primitives are typically specified by X, Y, Z and W coordinate data and R, G, B and α color data and texture S, T, R and Q coordinates for portions of the primitives, such as vertices.

Data representing the primitives in three dimensions is provided by the front-end subsystem 102 to the frame buffer subsystem 106 over bus 112 to the optional texture mapping subsystem 104. The texture mapping subsystem 104 interpolates the received primitive data to provide values from stored texture maps to the frame buffer subsystem 106 over one or more buses 114.

The frame buffer subsystem 106 interpolates the primitive data received from the front-end subsystem 102 to compute the pixels on the display screen that will represent each primitive, and to determine object color values and Z values for each pixel. The frame buffer subsystem 106 combines, on a pixel-by-pixel basis, the object color values with the resulting texture data provided from the optional texture mapping subsystem 104, to generate resulting image R, G and B values for each pixel. R, G and B color control signals for each pixel are respectively provided over R, G and B lines 116 to control the pixels of the display screen (not shown) to display a resulting image on the display screen that represents the texture-mapped primitive.

The front-end subsystem 102 includes a distributor 118 configured in accordance with the present invention and a plurality of three-dimensional geometry accelerators 120A–120P (collectively and generally referred to as geometry accelerators 120). As noted, the distributor 118 receives the coordinate and other primitive data over bus 110 from a graphics application on the host computer 108. The distributor 118 dynamically allocates the primitive data among the geometry accelerators 120 in accordance with the present invention as described below.

Primitive data, including vertex state (coordinate) and property state (color, lighting, etc.) data, is provided over bus 126 to the geometry accelerators 120. Each geometry accelerator 120 performs well-known geometry accelerator functions which results in rendering data for the frame buffer subsystem 106. Rendering data generated by the geometry accelerators 120 is provided over output bus 128 to distributor 118. Distributor 118 reformats the primitive output data (that is, rendering data) received from the geometry accelerators 120, performs a floating point to fixed point conversion, and provides the primitive data stream over bus 112 to the optional texture-mapping subsystem 104 and subsequently to frame buffer subsystem 106.

The texture mapping subsystem 104 and frame buffer subsystem 106 may be any well-known systems now or later developed. Furthermore, the front-end subsystem 102, texture mapping subsystem 104 and frame buffer subsystem 106 are preferably pipelined and operate on multiple primitives simultaneously. While the texture mapping subsystem 104 and the frame buffer subsystem 106 operate on primitives previously provided by the front-end subsystem 102, the front-end subsystem 102 continues to operate and provide new primitives until the pipelines in the subsystems 104 and 106 become full.

Figure 2:
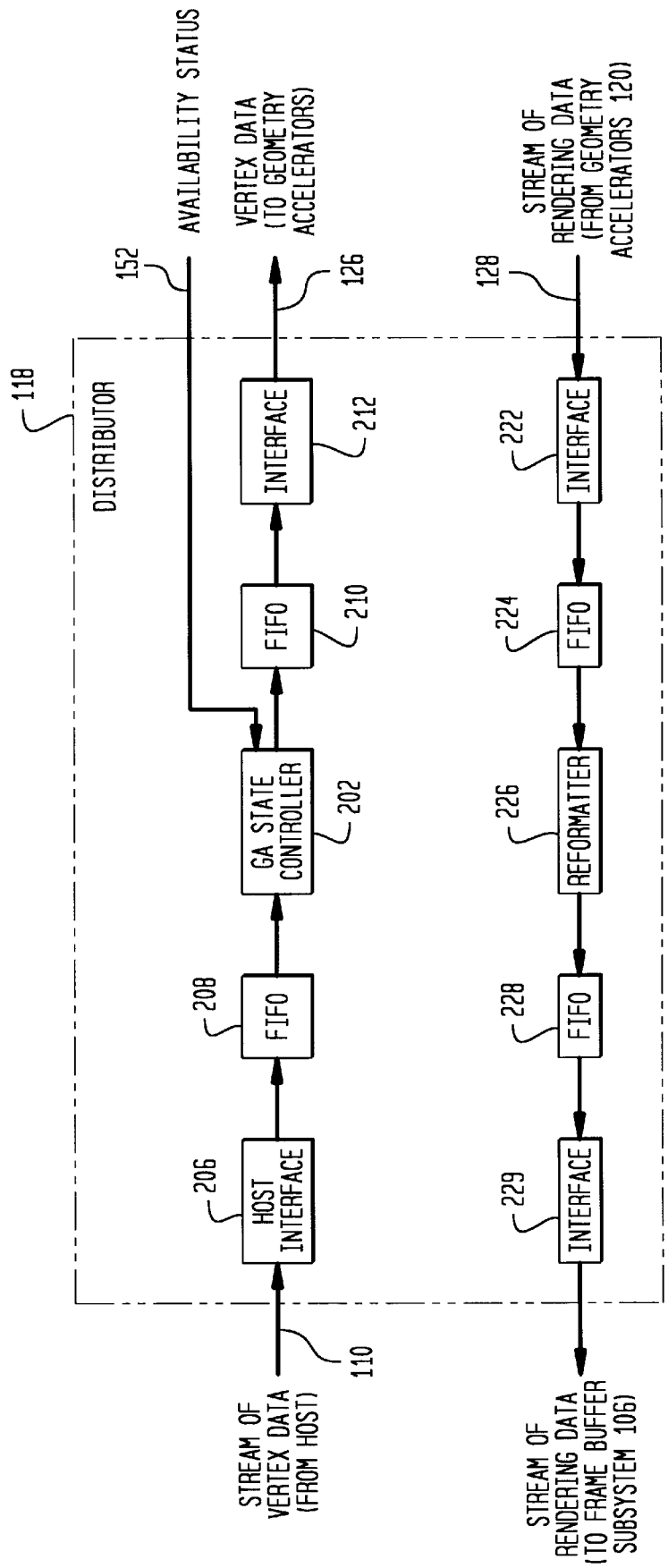
FIG. 2 is a block diagram of one embodiment of the distributor of the present invention illustrated in FIG. 1.

B. Parallel Processing of Primitive Data in a Multiple Geometry Accelerator Architecture FIG. 2 is a functional block diagram of one embodiment of the distributor 118 of the present invention. The dynamic allocation of primitive data to the plurality of geometry accelerators 120 in accordance with the present invention is described below with reference to FIGS. 1 and 2. The distributor 118 receives a stream of primitive data representative of graphics primitives from a driver on the host computer 108 over bus 110 and distributes this primitive data to the geometry accelerators 120 via the input bus 126. Since the geometry accelerators 120 may process data in parallel, it is preferable to establish a method for dividing the work of processing the primitive data among all of the geometry accelerators 120. The distributor 118 divides the primitive data into chunks. A chunk is defined as a number of vertices and associated state data that are allocated to a specific geometry accelerator 120. The distributor 118 sends a chunk of primitive data to each of the geometry accelerators 120 to achieve a desired parallelization.

One method which may be used to distribute primitive data among the geometry accelerators 120, referred to as the "round-robin" approach, is described in commonly-owned U.S. patent application Ser. No. 08/634,458 entitled "COMPUTER GRAPHICS SYSTEM UTILIZING PARALLEL PROCESSING FOR ENHANCED PERFORMANCE" to Shah et al., filed on Apr. 18, 1996, and hereby incorporated by reference in its entirety. With this technique, the distributor 118 sends chunks of primitive data to each of the geometry accelerators 120 in a predetermined sequential order. This sequence is repeated indefinitely until all of the primitive data for rendering a desired model has been processed. The hardware downstream of the geometry accelerators 120 receives and combines the separate chunks of rendering data using the same predetermined sequence. Thus, in this arrangement the geometry accelerators 120 produce chunks of rendering data that are later combined to form a stream of rendering data representing a sequence of graphics primitives that is in the same sequence as the graphics primitives represented by the stream of primitive data.

In a preferred alternative embodiment, the distributor 118 performs what is referred to as dynamic chunk allocation. That is, the distributor 118 dynamically determines which geometry accelerator 120 is to receive each chunk of primitive data based upon the relative current capability of the geometry accelerators to process the primitive data. This method of distributing primitive data among multiple geometry accelerators is described in commonly-owned U.S. patent application Ser. No. 08/781,671 entitled "SYSTEM AND METHOD FOR DYNAMICALLY ALLOCATING DATA AMONG GEOMETRY ACCELERATORS IN A COMPUTER GRAPHICS SYSTEM," naming as inventors, Eric M. Rentschler, Alan S. Krech, Jr. and Noel D. Scott, filed Jan. 10, 1997, the specification of which is hereby incorporated by reference in its entirety.

The output of each geometry accelerator 120 is rendering data corresponding to the primitives represented by the chunks of primitive data supplied to that geometry accelerator. In the latter preferred embodiment, the geometry accelerators output the resulting chunks of rendering data onto bus 128 in such a manner as to insure that they are combined into a stream of rendering data that preserves the original relative order of the chunks of primitive data supplied to the geometry accelerators 120. The distributor 118 receives the chunks of rendering data from the geometry accelerators 120 and forwards the stream of rendering data onto bus 112 to frame buffer subsystem 106 and texture mapping subsystem 104 (if present).

A graphics interface is typically provided to enable graphics applications located on the host computer 108 to efficiently control the graphics system 100. In a preferred embodiment, the OpenGL® standard is utilized to provide an application program interface (API) to graphics system 100. (OpenGL is a registered trademark of Silicon Graphics, Inc.).

The OpenGL software interface provides specific commands that are used to specify objects and operations to produce interactive, three-dimensional applications. OpenGL is a streamlined, hardware-independent interface designed to be implemented on many different hardware platforms. As such, in computer systems which support OpenGL, the operating systems and graphics application software programs can make calls to the computer graphics system according to the standardized API without knowledge of the underlying hardware configuration.

The OpenGL standard provides a complete library of low-level graphics manipulation commands for describing models of three-dimensional objects (the "GL" of OpenGL refers to "Graphics Library"). This standard was originally based on the proprietary standards of Silicon Graphics, Inc., but was later transformed into an open standard which is used in high-end graphics-intensive workstations and, more recently, in high-end personal computers. The OpenGL standard is described in the OPENGL PROGRAMMING GUIDE, version 1.1 (1997), the OPENGL REFERENCE MANUAL, version 1.1 (1997), and a book by Segal and Akeley (of SGI) entitled THE OPENGL GRAPHICS SYSTEM: A SPECIFICATION (Version 1.0), all of which are hereby incorporated by reference in their entirety.

Referring to FIG. 2, the distributor 118 includes a geometry accelerator (GA) state controller 202 configured to perform the geometry accelerator state management functions of the present invention. A host interface 206 decodes read/write transactions generated by a driver preferably on the host bus 110, and sends the transactions to an input buffer 208. The driver on the host processor 108 provides an interface, preferably the OpenGL graphics API, to graphics applications on the host computer 108. Input buffer 208 is preferably a first-in-first-out (FIFO) that buffers all data supplied to the graphics system 100. An output buffer 210, which is also preferably a FIFO buffer, receives chunks of primitive data from the state controller 202. An interface block 212 provides chunks of primitive data to the geometry accelerators 120 over bus 126.

In the above-noted embodiment wherein the distributor 118 dynamically allocates chunks of primitive data to the geometry accelerators 120, the geometry accelerators 120 preferably provide an availability status to the distributor 118. The availability status indicates the geometry accelerators' current capability to process primitive data. In the illustrative embodiment, availability status bits are provided to the distributor 118 through lines 152 by the geometry accelerators 120.

In this embodiment, after each chunk of primitive data generated by the GA state controller 202 is transmitted over input bus 126, the GA state controller 202 globally transmits one or more geometry accelerator control words which are received by all the geometry accelerators 120 in the system 100. These geometry accelerator control words represent the completion of the transmission of a chunk of primitive data. Accordingly, these control words are referred to herein as an End-Of-Chunk (EOC) control words, or simply EOCs. The geometry accelerators 120 utilize the EOCs to determine which geometry accelerator 120 has been selected by the distributor 118 to be the geometry accelerator which to receive the next chunk of primitive data. Each EOC causes a next sequential geometry accelerator 120 to receive the next chunk of primitive data. The distributor 118 may send a chunk of data to any desired geometry accelerator by generating an appropriate number of EOCs equivalent to the number of geometry accelerators 120 between a "current" geometry accelerator and a desired next current geometry accelerator.

As noted, in the above-noted embodiment, the distributor 118 receives the resulting stream of rendering data from the geometry accelerators 120. The distributor 118 includes an interface module 222 that interfaces with the first geometry accelerator 120A and transfers the chunks of rendering data to a FIFO 224. A reformatter 226 formats the stream of rendering data as necessary for the texture subsystem 104 (if present) and the frame buffer subsystem 106. For example, the reformatter 226 may perform a floating point-to-fixed point conversion, and provide the resulting data to an output FIFO 228. The stream of rendering data is then provided to the frame buffer subsystem 106, possibly through the texture subsystem 104, using an appropriate interface 229.

C. Primitive Specification and Assembly

In a preferred embodiment of the present invention, the geometry accelerator (GA) state controller 202 and distributor 118 are configured to operate in a graphics system 100 which provides the OpenGL API software interface. As noted, such an interface is preferably supported by a driver software program residing on the host computer 108 which communicates with graphics applications on the host 108. A graphics application on the host computer 108 issues calls in accordance with the standard OpenGL API. The driver may convert the call required to communicate with the graphics hardware 100 and/or pass the API calls through to the graphics hardware 100.

In this embodiment, the host 108 executes software known as driver code that converts standard calls specified by the OpenGL API to access the graphics system 100 to render three-dimensional images using the graphics system 100 of the present invention. As is well known, with OpenGL, all geometric objects are ultimately described as an ordered set of vertices. The glVertex() command is provided to specify a single vertex for use in describing a geometric object. Up to four coordinates (x, y, z, w) may be supplied for a particular vertex or as few as two (x, y) by selecting the appropriate version of the command.

To create a primitive, such as a point, line or polygon, the set of vertices must be bracketed between a call to a glBegin() command and a call to a glEnd() command, commonly referred to as a glBegin()/glEnd() pair. The argument passed with the glBegin() determines the type of geometric primitive to be constructed from the vertices. Referring to FIGS. 3A–3J, the currently-available primitive types supported by the present invention are described below.

Figure 3A:
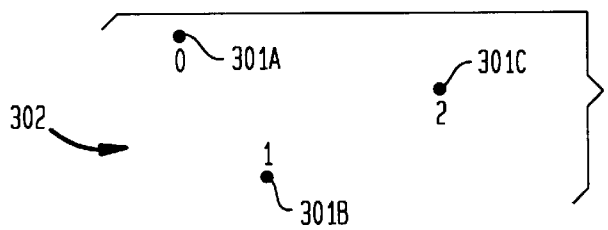
FIG. 3A is a diagram of a series of independent point primitives which may be rendered on a computer display screen.

The command glBegin(GL_POINTS) specifies individual points to be displayed. Specifically, the command causes the graphics system 100 to draw a point at each of the n vertices bracketed by the glBegin()/glEnd() pair. Referring to FIG. 3A, there are three points 301A, 301B and 301C, each of which is drawn at one of the vertices $v_0$, $v_1$ and $v_2$, respectively.

Figure 3B:
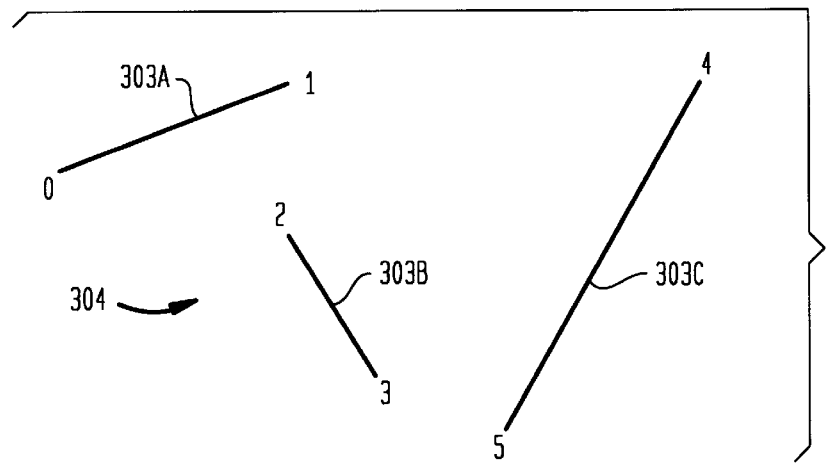
FIG. 3B is a diagram of a series of independent line primitives which may be rendered on a computer display screen.

The command glBegin(GL_LINES) specifies pairs of vertices interpreted as the end points of individual line segments. Specifically, the command causes the graphics system 100 to draw a series of unconnected line segments. Line segments are drawn between $v_0$ and $v_1$, between $v_2$ and $V_3$, and so on. If n is odd, the last segment is drawn between $v_{n-3}$ and $v_{n-2}$ and $V_{n-1}$ is ignored. Referring to FIG. 3B, lines 304 include a line 303A drawn between vertices $v_0$ and $v_1$, line 303B drawn between vertices $v_2$ and $V_3$, and line 303C drawn between vertices $V_4$ and $v_5$. As shown, the lines 303A, 302B and 303C are independent primitives; that is, they do not have a common vertex; they are unconnected line segments.

Figure 3C:
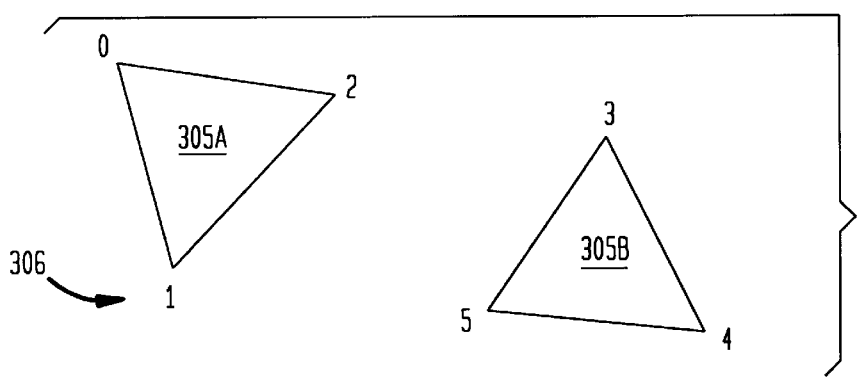
FIG. 3C is a diagram of a series of independent triangle primitives which may be rendered on a computer display screen.

The command glBegin(GL_TRIANGLES) specifies triples of vertices interpreted as the end points of a triangle. Specifically, the command causes the graphics system I 00 to draw a series of triangles (three-sided polygons) using vertices $v_0$, $v_1$, $v_2$, then $v_3$, $V_4$, $v_5$, and so on. If n is not an exact multiple of 3, the final one or two vertices are ignored. Referring to FIG. 3C, triangles 306 include a triangle 305A defined by vertices $v_0$, $v_1$ and $v_2$, and triangle 305B defined by vertices $V_3$, $V_4$ and $v_5$. As shown, the triangles 305A and 305B do not have common vertices; that is, they are independent primitives.

Figure 3D:
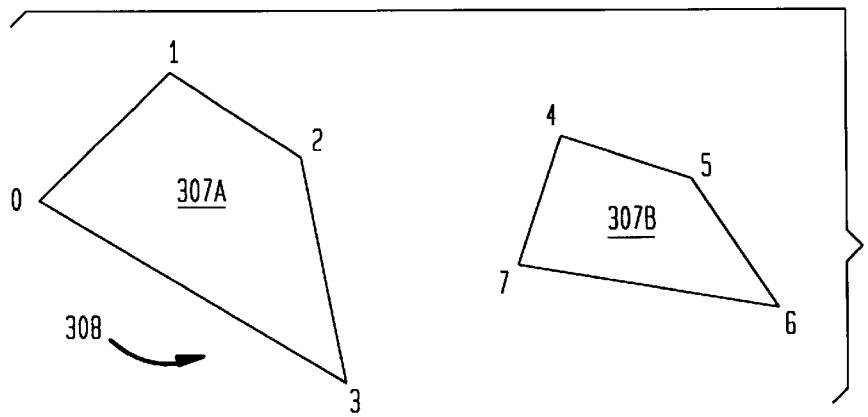
FIG. 3D is a diagram of a series of independent quadrilateral primitives which may be rendered on a computer display screen.

The command glBegin(GL_QUADS) specifies quadruples of vertices interpreted as four-sided polygons. Specifically, the command causes the graphics system 100 to draw a series of quadrilaterals (four-sided polygons) using vertices $v_0$, $v_1$, $V_2$, $V_3$, then $V_4$, $V_5$, $V_6$, $V_7$, and so on. If n is not a multiple of 4, the final one, two, or three vertices are ignored. Referring to FIG. 3D, the quadrilaterals 308 include a quadrilateral 307A drawn between vertices $v_0$, $v_1$, $v_2$, and $V_3$ and quadrilateral 307B drawn by vertices $V_4$, $V_5$, $V_6$, and $V_7$. As shown, the quadrilaterals 307A and 307B do not share a common vertex and are, therefore, independent quadrilaterals.

Figure 3E:
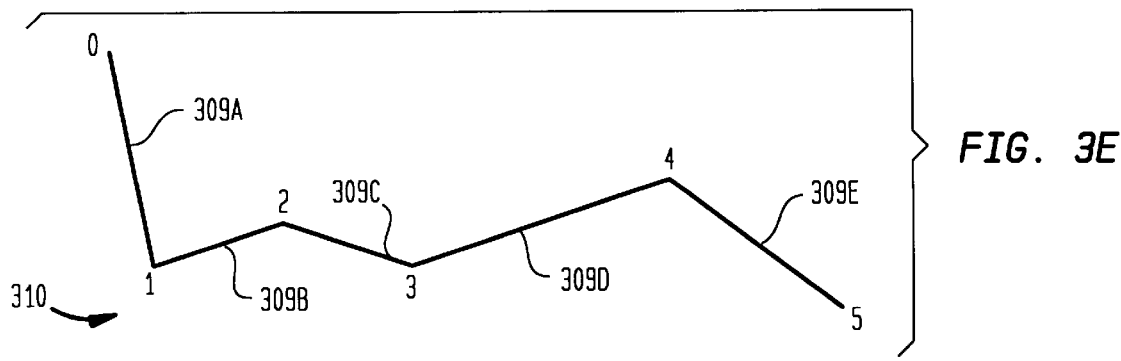
FIG. 3E is a diagram of a line strip primitive which may be rendered on a computer display screen.

The command glBegin(GL_LINE_STRIP) specifies a series of connected line segments. Specifically, the command draws a line segment from $v_0$ to $v_1$, then from $v_1$ to $v_2$, and so on, finally drawing the segment from $v_{n-2}$ to $v_{n-1}$. Thus, a total of n-1 line segments are drawn. Nothing is drawn unless n is larger than 1. There are no restrictions on the vertices describing a line strip primitive; the lines can intersect arbitrarily. Referring to FIG. 3E, line strip 310 is comprised of line 309A drawn between vertices $v_0$, and $v_1$, line 309B drawn between vertices $v_1$ and $v_2$, line 309C drawn between vertices $v_2$ and $V_3$, line 309D drawn between vertices $V_3$ and $v_4$ and line 309E drawn between vertices $V_4$ and $V_5$. As shown, each of these lines 309A–309E are connected to form a single line strip 310 primitive.

Figure 3F:
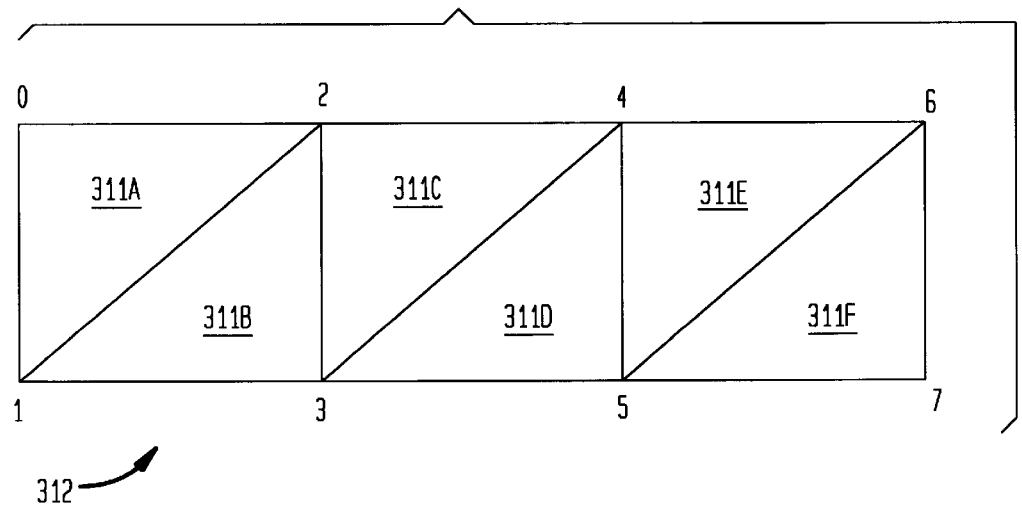
FIG. 3F is a diagram of a triangle strip primitive which may be rendered on a computer display screen.

The command glBegin(GL_TRIANGLE_STRIP) specifies a linked strip of triangles. Specifically, the command causes the graphics system 100 to draw a series of triangles (three-sided polygons) using $v_0$, $v_1$, $v_2$, then $v_2$, $v_1$, $v_3$, then $v_2$, $v_3$, $v_4$, and so on. The ordering is to ensure that the triangles are all drawn with the same orientation so that the strip can correctly form part of a surface. n must be at least 3 for anything to be drawn. Referring to FIG. 3F, triangle strip 312 is comprised of triangle 311A drawn between vertices $v_0$, $v_1$ and $v_2$, triangle 311B drawn between by vertices $v_1$, $v_2$ and $v_3$, triangle 311C drawn between defined by vertices $v_2$, $v_3$ and $v_4$, triangle 311D drawn between vertices $v_3$, $v_4$ and $v_5$, triangle 311E drawn between vertices $v_4$, $v_5$ and $v_6$ and triangle 311F drawn between vertices $v_5$, $v_6$ and $v_7$. As shown, the triangles 311A–311F are drawn with the same orientations to form a triangle strip primitive 312.

Figure 3G:
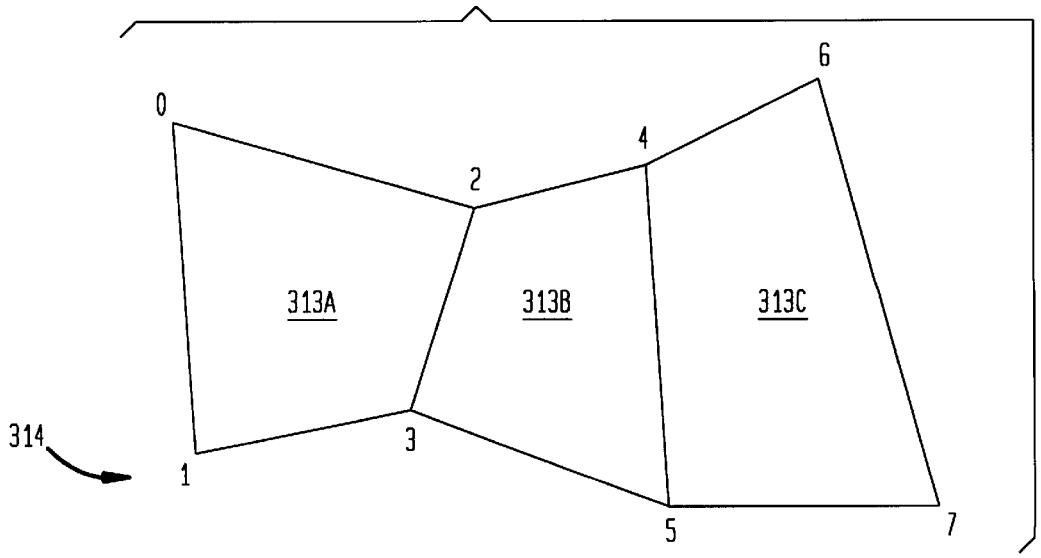
FIG. 3G is a diagram of a quadrilateral strip primitive which may be rendered on a computer display screen.

The command glBegin(GL_QUAD_STRIP) specifies a linked strip of quadrilaterals. Specifically, the command causes the graphics system 100 to draw a series of quadrilaterals (four-sided polygons) beginning with $v_0$, $v_1$, $v_3$, $v_2$, then $v_2$, $v_3$, $v_5$, $v_4$, then $v_4$, $v_5$, $v_7$, $v_6$, and so on. n must be at least 4 before anything is drawn. If n is odd, the final vertex is ignored. Referring to FIG. 3G, the quadrilateral strip 314 is comprised of quadrilateral 313A drawn between vertices $v_0$, $v_1$, $v_2$ and $v_3$, quadrilateral 313B drawn between vertices $v_2$, $v_3$, $v_4$, and $v_5$, and quadrilateral 313C drawn between vertices $v_4$, $v_5$, $v_6$ and $v_7$. As shown, neighboring quadrilaterals have two shared vertices and, therefore, share a common side with at least one neighboring quadrilateral.

Figure 3H:
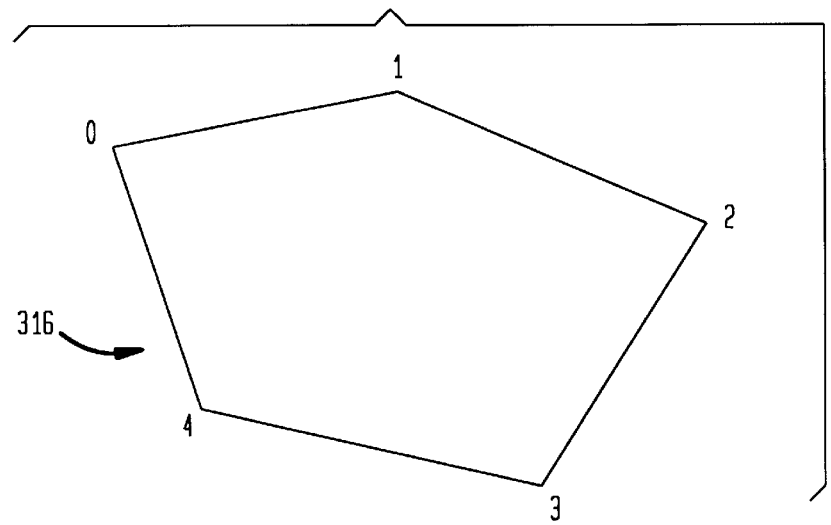
FIG. 3H is a diagram of a polygon primitive which may be rendered on a computer display screen.

The command glBegin(GL_POLYGON) specifies the boundary of a simple, convex polygon. Specifically, the command causes the graphics system 100 to draw a polygon using the points $v_0$, . . . , $v_{n-1}$, as vertices. n must be at least 3, or nothing is drawn. If the vertices do not satisfy these conditions, the results are unpredictable. Referring to FIG. 3H, polygon 316 is defined by vertices $v_0$, $v_1$, $v_2$, $v_3$ and $v_4$. As shown, the polygon 316 is convex; that is, a line connecting any two points within the polygon 316 does not intersect any boundary of the polygon.

Figure 3I:
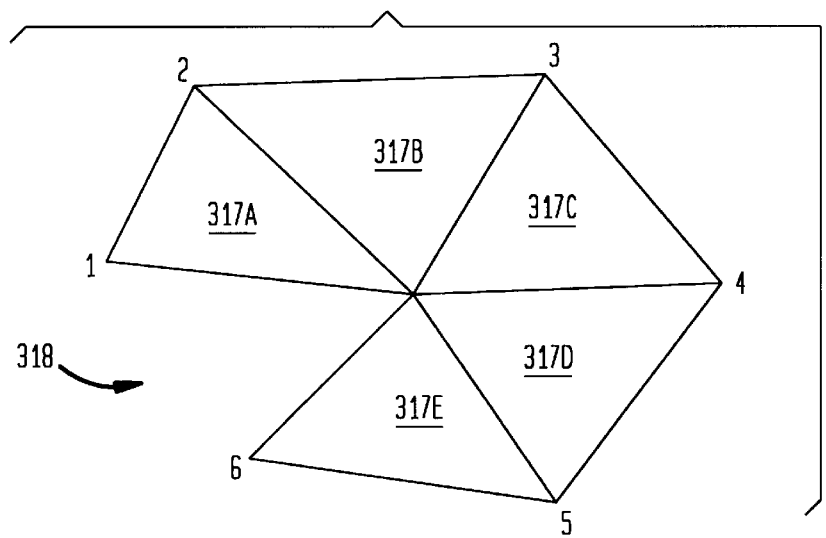
FIG. 3I is a diagram of a triangle fan primitive which may be rendered on a computer display screen.
Figure 3J:
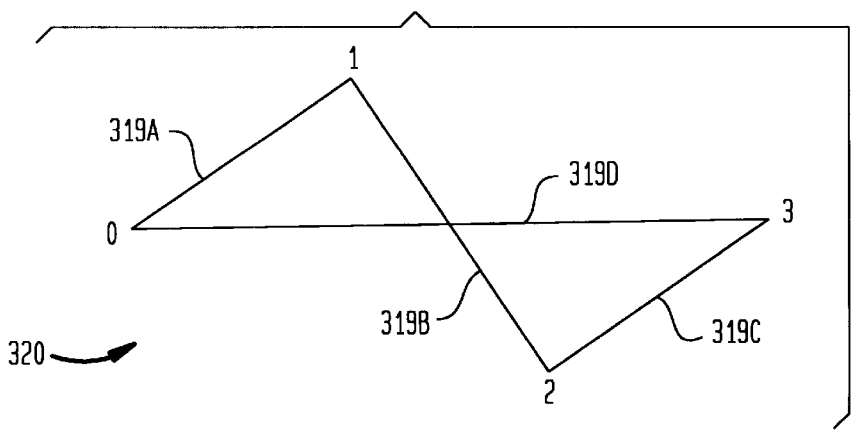
FIG. 3J is a diagram of a line loop primitive which may be rendered on a computer display screen.

The command glBegin(GL_TRIANGLE_FAN) specifies a linked fan of triangles. Specifically, the command causes the graphics system 100 to draw a series of triangles (three-sided polygons) using $v_0, v_1, v_2$, then $v_0, v_2, v_3$, then $v_0, v_3, v_4$, and so on. n must be at least 3 for anything to be drawn. Referring to FIG. 3I, the triangle fan 318 includes triangle 317A drawn between vertices $v_0, v_1$ and $v_2$, the triangle 317B drawn between vertices $v_0, v_2$ and $v_3$, the triangle 317C drawn between vertices $v_0, v_3$ and $v_4$, the triangle 317D drawn between vertices $v_0, v_4$ and $v_5$ and the triangle 317E drawn between vertices $v_0, v_5$ and $v_6$. As shown, neighboring triangles have two common vertices, vertex 0 and one other vertex.

The command glBegin(GL_LINE_LOOP) specifies a series of connected line segments, with a segment added between the last and first vertices. Specifically, the command causes the graphics system 100 to draw a line segment from $v_0$ to $v_1$, then from $v_1$ to $v_2$, and so on, drawing a line segment from $v_{n-2}$ to $v_{n-1}$. When the glEND (1) is received, a final line segment is drawn from $v_{n-1}$ to $v_{n-0}$, completing the line loop. Thus, a total of n line segments are drawn. Nothing is drawn unless n is larger than 1. There are no restrictions on the vertices describing a line loop; the lines can intersect arbitrarily. For example, referring to FIG. 3J, a line loop 320 is comprised of line segment 319A drawn between vertices $v_0$ and $v_1$, line 319B drawn between vertices $v_1$ and $v_2$, line 319C drawn between vertices $v_2$ and $v_3$ and line 319D drawn between vertices $v_3$ and $v_0$. As shown, the final line segment, line 319D, completes the line loop primitive 320.

The glVertex() command specifies what is referred to herein as a vertex State or VS. In addition to specifying the vertices, there is additional well known primitive data that specify properties with which the geometry accelerators 120 render the vertices. The values of the vertex-specific properties are established through the use of specific commands provided by the OpenGl, API. This optional property data may be provided before or between the glBegin()/glEndA() pair.

Graphics systems in general, and OpenGL specifically, behave as a state machine. Accordingly, a specified property value remains in effect until it is changed. That is, all subsequently-received vertices are rendered with the currently-effective value for each property. As a result, when the glVertex571 command is called, the current geometry accelerator applies the currently-effective property value to the resulting vertex. These properties include, for example, the current color, current color index, normal vector coordinates, texture coordinates, current viewing and projections transformations, line and polygon stipple patterns, polygon drawing modes, pixel-packing conventions, positions and characteristics of lights, and material properties of the objects being drawn. Typically, properties are enabled or disabled with the command glEnable() or glDisable(). Once the properties have been applied to a vertex, the vertices are assembled into primitives with the relevant properties.

D. Geometry Accelerator State Controller

Figure 4:
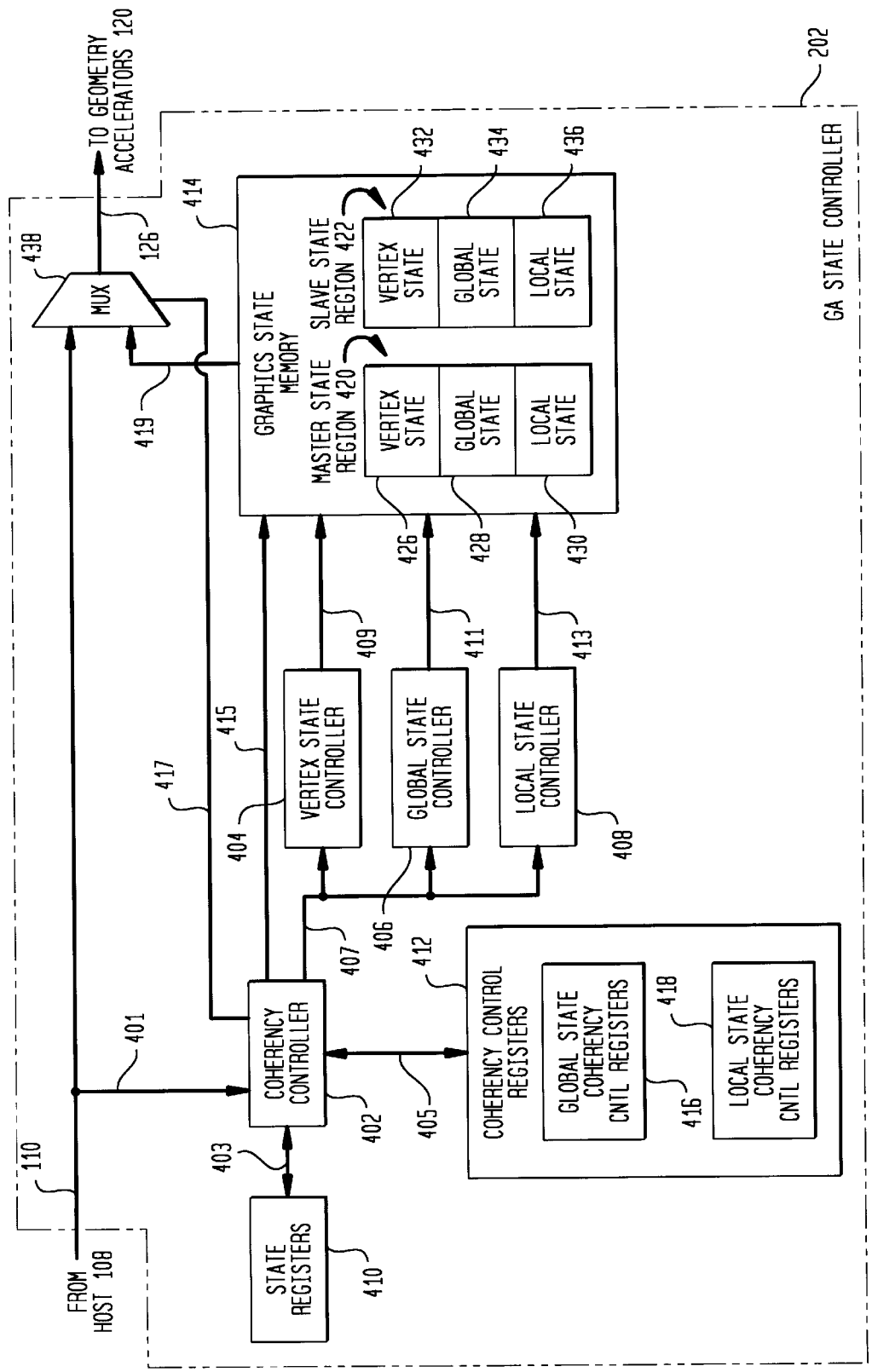
FIG. 4 is a functional block diagram of one embodiment of the GA state controller of the present invention illustrated in FIG. 2.

FIG. 4 is a functional block diagram of one embodiment of the geometry accelerator (GA) state controller 202. Due to the allocation of vertex data among multiple geometry accelerators 120, the primitive data necessary to render a primitive may be distributed across more than one geometry accelerator 120. As a result, for some primitives no one geometry accelerator 120 will have all of the primitive data necessary to assemble the primitive. Alternatively, if all of the primitive data is provided to all of the geometry accelerators 120 in the system, then each of the geometry accelerators 120 will be provided with an excessive amount of data than is necessary for it to render the primitives it is responsible for rendering. With such an approach, the geometry accelerators 120 would require additional input buffers to store such excess information. In addition, significant processing and communication bandwidth would be needlessly absorbed with such an approach.

In accordance with the present invention, the GA state controller 202 dynamically stores and resends selected primitive data to the geometry accelerators 120 to insure proper primitive assembly in a multiple geometry accelerator architecture. Specifically, the GA state controller 202 selectively provides the current geometry accelerator 120 with the necessary primitive data, including vertex state and property state data, to enable the current geometry accelerator to properly assemble primitives without unnecessarily absorbing communication and processing bandwidth. More specifically, the GA state controller 202 controls the flow of primitive data to the geometry accelerators 120, interposing previously-stored primitive data into the flow of primitive data to the geometry accelerators 120 so that the geometry accelerators receive the primitive data in the proper sequence such that the proper property value is utilized by the geometry accelerators to render a vertex. Prior to describing the functional architecture and operation of the GA state controller 202, the unique manner in which the present invention processes the property states is first described below.

1. Property State Characterization

In a preferred embodiment of the present invention, vertex property states are logically divided into one or more categories or groupings according to the frequency at which the property state is changed during the rendering of an object or model. Since the graphics system 100 behaves as a state machine, a change in property state requires the graphics application to make a call to the OpenGL graphics interface to change the currently-effective property state value. This property state value remains effective until it is changed once again and vertices are drawn in accordance with the currently-effective property state value. In one preferred embodiment, the property states are divided into two categories: local property states or, simply, local states (LS) and global property states or global states (GS).

A local state is a property state which is typically altered often during the rendering of a graphics image. Accordingly, for each local state, multiple local state values are generally provided to the graphics system 100 pipeline by the graphics application residing in host 108. In other words, it is not uncommon for different vertices to be drawn with different local state values. As a result, in the parallel geometry accelerator architecture shown in FIG. 1, different local state values will likely be provided to different geometry accelerators 120 during the rendering of an image. As a result, in accordance with the present invention, the property states which are included within the local state category are provided only to the current geometry accelerator 120. That is, when a local state changes (a different value is provided by the graphic application), this new local state is sent only to the current geometry accelerator 120. The geometry accelerators which are not the current geometry accelerator are not provided with the new local state value.

A global state is a property state which is rarely altered during the rendering of a model or object. It is generally set at the beginning of a rendering sequence and is not altered until a later set of primitives or image are to be displayed. Therefore, global states include properties which apply to many vertices as compared to local states which typically apply to only a few vertices or, not uncommonly, just one vertex. Accordingly, a new global state is rarely provided to the graphics system pipeline by the graphics application residing in host processor 108 and is effective for the rendering of a relatively large number of vertices. As a result, in the parallel geometry accelerator architecture shown in FIG. 1, the same global state value will likely be required to render vertices provided to many of the geometry accelerators 120. Thus, in accordance with the present invention, global states are provided to all of the geometry accelerators 120 simultaneously by the GA state controller 202. In other words, global states are globally distributed to all of the geometry accelerators 120 and processed in the same manner as the graphics system commands which are also provided to all of the geometry accelerators 120. For example, with OpenGL, the glBegin() command which is received from the host processor 108 is provided to all of the geometry accelerators 120 by the GA state controller 202 so that each of the geometry accelerators 120 is aware of the type of primitive which is to be rendered. Global states are also provided to all of the geometry accelerators 120. On the other hand, local and vertex states are only provided to the current geometry accelerator.

In the illustrative embodiment shown in FIG. 4, the GA state controller 202 includes a graphics state memory 414 configured in accordance with the present invention. The GA state controller 202 also includes a coherency controller 402 which accesses and controls state registers 410 and coherency control registers 412 to determine which of the vertex states (VS), global states (GS) and local states (LS) received from the host 108 are to be stored in graphic state memory 414. The GA state controller 202 also contains a vertex state controller 404, global state controller 406 and local state controller 408. The controllers 404–408 control the resending of the vertex, global and local states stored in the graphic state memory 414 to geometry accelerators 120 based upon the contents of the coherency registers 412. The global and local states are sent to the Geometry Accelerators before their corresponding vertex states.

The graphics state memory 414 is configured in accordance with the present invention to store selected primitive data, including vertex states, global states and local states, received from the host processor 108 over bus 110. The graphics state memory 414 is logically divided into multiple memory regions each dedicated to storing the vertex, global and local states which are associated with a particular "system state." For example, if the property state values currently on the host bus 110 represent a current system state, referred to as state "n", one memory region may include property state values associated with an immediately prior system state, referred to as state "n-1". Another memory region may contain property state values associated with a next prior system state, referred to as state "n-2", or with the initial system state, referred to as system state "0".

The number of graphics state memory regions is determined by the maximum number of selected vertex, global or local states which may be simultaneously stored for later resending to the geometry accelerators 120. In a preferred embodiment, this is determined by the type of primitive being rendered. That is, the maximum number of vertex, global and local states which may have to be resent to a different geometry accelerator is a function of the type of primitive that is being rendered. As will be explained in detail below, in a preferred embodiment there are two regions in graphics state memory 414. These regions are referred to herein as the master state memory 420 and the slave state memory 422. Two regions of the graphics state memory 414 are utilized because no more than two prior vertices (vertex states and their associated global or local states, if any) are required to be resent to the geometry accelerators. This is primarily due to the configuration of the primitives described above with reference to FIGS. 3A-3J and the manner in which the GA state controller 202 controls the flow of primitive data to the geometry accelerators 120. Thus, in accordance with the present invention, master state memory 420 includes vertex state registers 426, global state registers 428 and local state registers 430. Likewise, slave state memory 422 includes vertex state registers 432, global state registers 434 and local state registers 436.

FIG. 5 is a table illustrating the contents of the vertex state registers 426 and 432. The vertex state registers 426 and 432 contain four 1-word registers, each containing one of the X, Y, Z and W coordinates. FIG. 6 is a table illustrating the contents of the global state registers 428 and 434. In a preferred embodiment of the present invention in which the graphics system 100 operates in accordance with the OpenGL API standard, the global states include the OpenGL material states. In OpenGL, the material properties of the objects in a scene include the ambient, diffuse and specular colors, the shininess and the color of any emitted light. The command for setting the material properties is the glMaterial() command which has the syntax glMaterial{if}(Glenum face, Glenum pname, TYPE param)

This command specifies a current material property for use in lighting calculations. Face can be GL_FRONT, GL_BACK, or GL_FRONT_AND_BACK to indicate to which face of the object the material should be applied. The particular material property being set is identified by pname and the desired values for the property are given by param, which is either a pointer or a group of values (when a vector version is used) or the actual value (when a non-vector version is used). There are a number of rules associated with the setting of material properties which are considered to be well known in the art and are fully described in the above-noted OpenGL Programming Guide and the OpenGL Reference Manual incorporated by reference above.

As shown in FIG. 6, these material states are separately maintained for the front face and back face since they can contain different values. The size and words of each of the associated registers is also shown in FIG. 6. Finally, the Coherency Dirty Bits column identifies associated coherency dirty bits which are utilized by the coherency controller 402 and are described in detail below.

FIG. 7 is a table illustrating the contents of the local state registers 430 and 436. In a preferred embodiment wherein the graphics system 100 is implemented in accordance with the OpenGL API standard, the local states include normal vector coordinates x, y and z, the current color r, g, b and $\alpha$, texture coordinates s, r, t and q and the edge flag. As shown in the table of FIG. 7, these values are floating point values, preferably stored in eleven 1-word registers except for the edge flag, which is stored as a single bit. FIG. 7 also identifies coherency dirty bits which are utilized by the coherency controller 402 and described in detail below.

FIG. 8 is a table illustrating the manner in which the master and slave state memories 420 and 422 are maintained in one embodiment of the present invention. The manner in which the state memories are maintained depends upon the type of primitive which is to be assembled by the geometry accelerators 120. The left-most column in the table refers to each of the primitive types described above with respect to FIGS. 3A–3J.

The remaining three columns of the table in FIG. 8 refer to the master state memory 420 and slave state memory 422 registers for the vertex state (registers 426 and 432), global state (registers 428 and 434) and local state (registers 430 and 436). Generally, the master state memory columns refer to when the associated state data is written into the respective master state registers 426–430. On the other hand, the slave state memory columns refer to when the contents of the memory locations in the master state memory 420 are copied to the corresponding memory locations in the slave state memory 422. It is understood that other approaches to storing data on the master and slave state memories may be used.

As will be described in detail below, the stream of primitive data received from the host 108 over bus 110 may pass through the GA state controller 202. In addition to providing the primitive data to the geometry accelerators 120, the GA state controller selectively stores primitive data in graphics state memory 414. Under certain conditions the GA state controller 202 suspends the primitive data at multiplexer 438. This is illustrated by the bus 110 being one of the inputs into the multiplexer 438. The manner in which the present invention selectively stores primitive data in the graphics state memory 414 is described in detail below with reference to the specific primitive types. Prior to such a discussion, however, the coherency issues, as defined in the present invention, which give rise to the need to store selected primitive data is described.

2. Coherency

The parallel processing of vertex data by multiple geometry accelerators 120 presents three general coherency issues, all of which are resolved by embodiments of the present invention. First, the current geometry accelerator 120 may not be provided with all of the vertex state data necessary to assemble a primitive because some of the vertex data may have been previously provided to another geometry accelerator. This may occur, for example, when the distributor 118 issues one or more EOCs causing a transition in the current geometry accelerator to occur during a sequence of vertices which are needed to assemble a specific primitive. In accordance with a preferred embodiment of the present invention, only those vertices which were sent to the previous current geometry accelerator and which are required to assemble a primitive are resent by the GA state controller 202 to the new current geometry accelerator 120. A vertex which is provided to two geometry accelerators 120 (that is, a vertex which is resent) is referred to herein as a "shared vertex", since it is "shared", or utilized, by two geometry accelerators.

Second, a current geometry accelerator 120 may not have the currently-effective value for a given local state and that state value is required by the current geometry accelerator to properly assemble a primitive. This problem arises in local states only as they are defined herein. As noted, global states are provided to all of the geometry accelerators 120. Accordingly, all geometry accelerators 120 have the currently-effective global state values. However, since local states are provided only to the current geometry accelerator in accordance with the present invention, then a subsequent current geometry accelerator will not have the currently-effective value for a local state which has changed since that geometry accelerator last was a current geometry accelerator. In accordance with the present invention, the coherency of the local state value stored in each of the geometry accelerators 120 is maintained in the coherency control registers 412 by the coherency controller 402. In accordance with the present invention, the GA state controller 202 resends the specific local states as necessary so that a current geometry accelerator 120 will have the currently-effective local state values to properly assemble a primitive.

Third, a currently-effective global and local state value may be received by the GA state controller 202 in between two shared vertices. If the primitive to be rendered requires vertices which were provided to the previous current geometry accelerator, then those vertices will need to be resent to the new current geometry accelerator as described above. However, the currently-effective global or local state value does not apply to the first shared vertex. Accordingly, the shared vertex or vertices will not be rendered with the proper global or local state values under such circumstances, if they alone are resent to the new current geometry accelerator. In accordance with the present invention, the stream of primitive data is controlled and only those global and local state values which are required to properly render the first shared vertex will be sent to the new current geometry accelerator along with each of the associated vertex state. Then, since the global or local state is different for the two shared vertex states, the global and local state values associated with the second shared vertex will be sent to the new current geometry accelerator along with the associated vertex state.

As noted, these vertex, global and local state values are stored in the graphics state memory 414. Which of these prior state values are to be resent to the geometry accelerators 120 is based upon the primitive type since certain primitives require more shared vertices than others. Therefore, the following naming convention has been established herein. The vertex state, global state, and local state values which are currently received from the host 108 are referred to as the currently-existing state values, or VS(n), GS(n) and LS(n). The prior vertex state, global state and local state values are referred to as VS(n-1), GS(n-1) and LS(n-1). These values are selectively stored in the master state memory 420. The next prior vertex state, global state and local state values are referred to as VS(n-2), GS(n-2) and LS(n-2). These values are selectively stored in the slave state memory 422. Vertex state, global state and local state values associated with a particular system state are identified numerically, such as VS(0).

The coherency controller 402 monitors the primitive data received from the host processor 108 over bus 110 as shown by connection line 401. The coherency controller 402 maintains the contents of the graphics state memory 414 via control/data line 415. Also, the coherency controller 402 accesses the coherency control registers 412 via control/data line 405. As shown in FIG. 4, the coherency control registers 412 include global state coherency control registers 416 and local state coherency control registers 418. The coherency of the global and local states are separately maintained since the circumstances that result in a global state being resent to the geometry accelerators are different than the circumstances which may result in a local state being resent, as described above. It is noted that there are no coherency control registers required for vertex states because properties are associated with vertices and are effective for the rendering of the vertices.

3. Coherency Control Registers

In general, the coherency control registers 412 identify when a particular global state or local state needs to be stored or resent to the geometry accelerators 120. In a preferred embodiment of the present invention, the coherency of the global and local states is represented by dirty bits. The coherency control registers 412 are accessed or referenced by the global state controller 406 and local state controller 408 to determine when to resend global and local states and, if so, which prior global and local states to resend and the sequence in which to send them.

FIG. 9 is a table summarizing the functions performed by the coherency controller 402 to maintain the coherency control registers 412. As shown in FIG. 9, and as will be explained in detail below, the global state coherency control registers 416 contain global state dirty bits while the local state coherency control registers 418 contain dirty vectors as well as dirty bits. The function of these various dirty vectors and bits is described in detail below. The manner in which the global state coherency control registers 416 and local state coherency control registers 418 are maintained by the coherency controller 402 is a function of the type of primitive which is to be rendered. Accordingly, the table in FIG. 9 contains a primitive type column along with columns for the global state dirty bits, local state dirty vectors and local state dirty bits. The contents of the FIG. 9 table, which summarize the setting and clearing of the associated dirty bits, are described in detail below.

Figure 10:
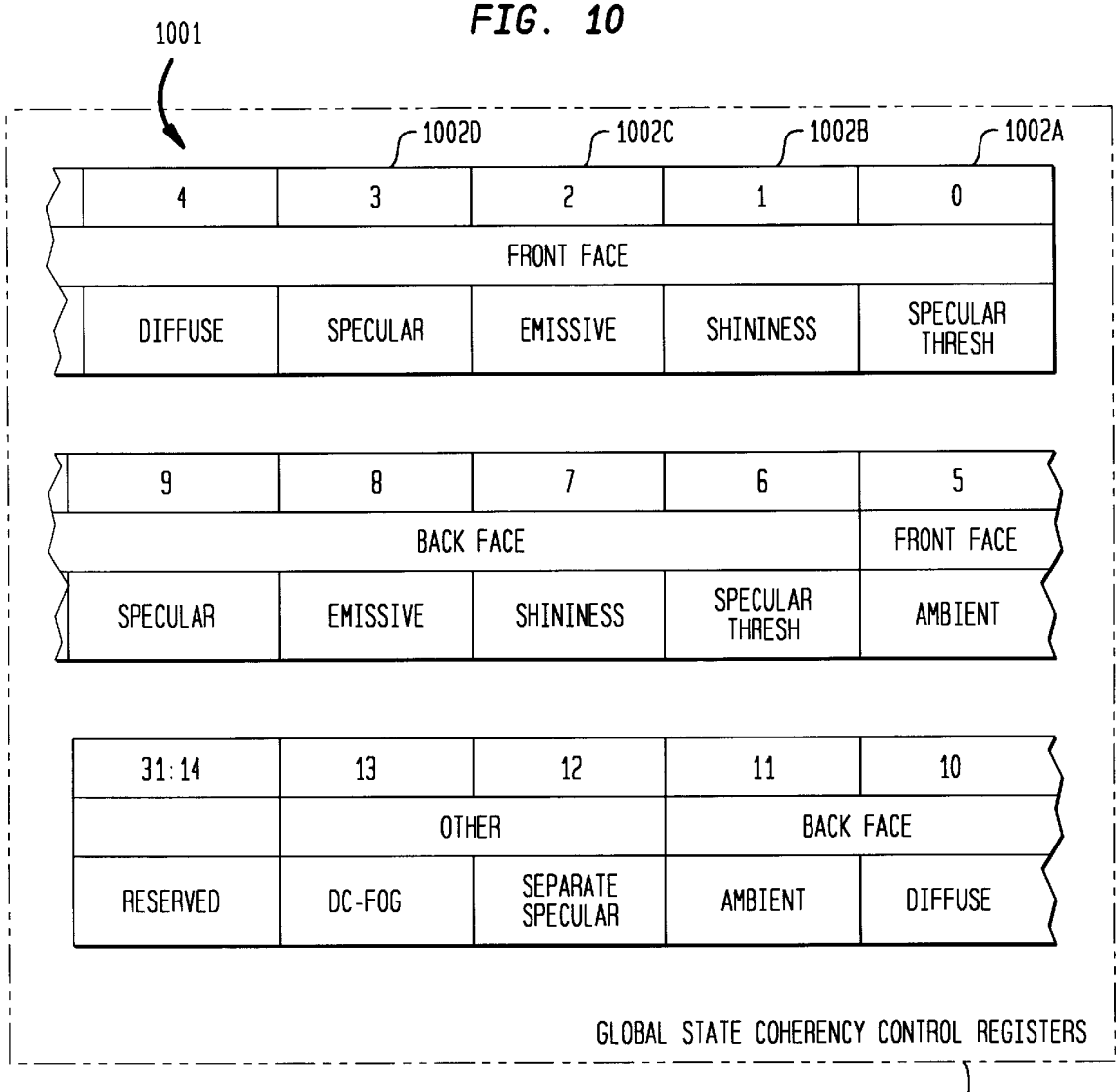
FIG. 10 is a diagram illustrating one embodiment of the global state coherency control registers of the present invention illustrated in FIG. 4.

FIG. 10 is a schematic block diagram of the global state coherency control registers 416. As noted, in a preferred embodiment of the present invention, the global states currently include the OpenGL material states described above with reference to FIG. 6. Accordingly, there is a dirty bit 1002 associated with each of the 14 material states shown in FIG. 6. Preferably a single 32-bit word 1001 includes the global state dirty bits 1002. The global state dirty bits are used in conjunction with the primitive type to determine whether any global state has been altered between the time one shared vertex is sent to a current geometry accelerator 120 and the time that a subsequent shared vertex is sent to the same current geometry accelerator 120. That is, the global dirty bit represents whether there is a change in a global state between shared vertices. It is only when there is a geometry accelerator transition during the rendering of a primitive type requiring two shared vertices that changes in the global state may result in the incorrect association of global states and vertices. The shared vertex may be a previous one or two vertices (VS(n- 1), VS(n-2)) or the initial vertex (VS(0)), depending on the type of primitive. Accordingly, if the global state dirty bit is set, then the prior global state value which was valid for the shared vertex will be resent to the new current geometry accelerator VS(n-2). Then, the shared vertex is sent to the new current geometry accelerator so that the appropriate global state is in effect for that shared vertex. The same sequence is performed for the second shared vertex VS (n-1). Once the resending action(s) are completed, then the new global state and subsequent vertex state are allowed to pass through the GA state controller 202.

Figure 11:
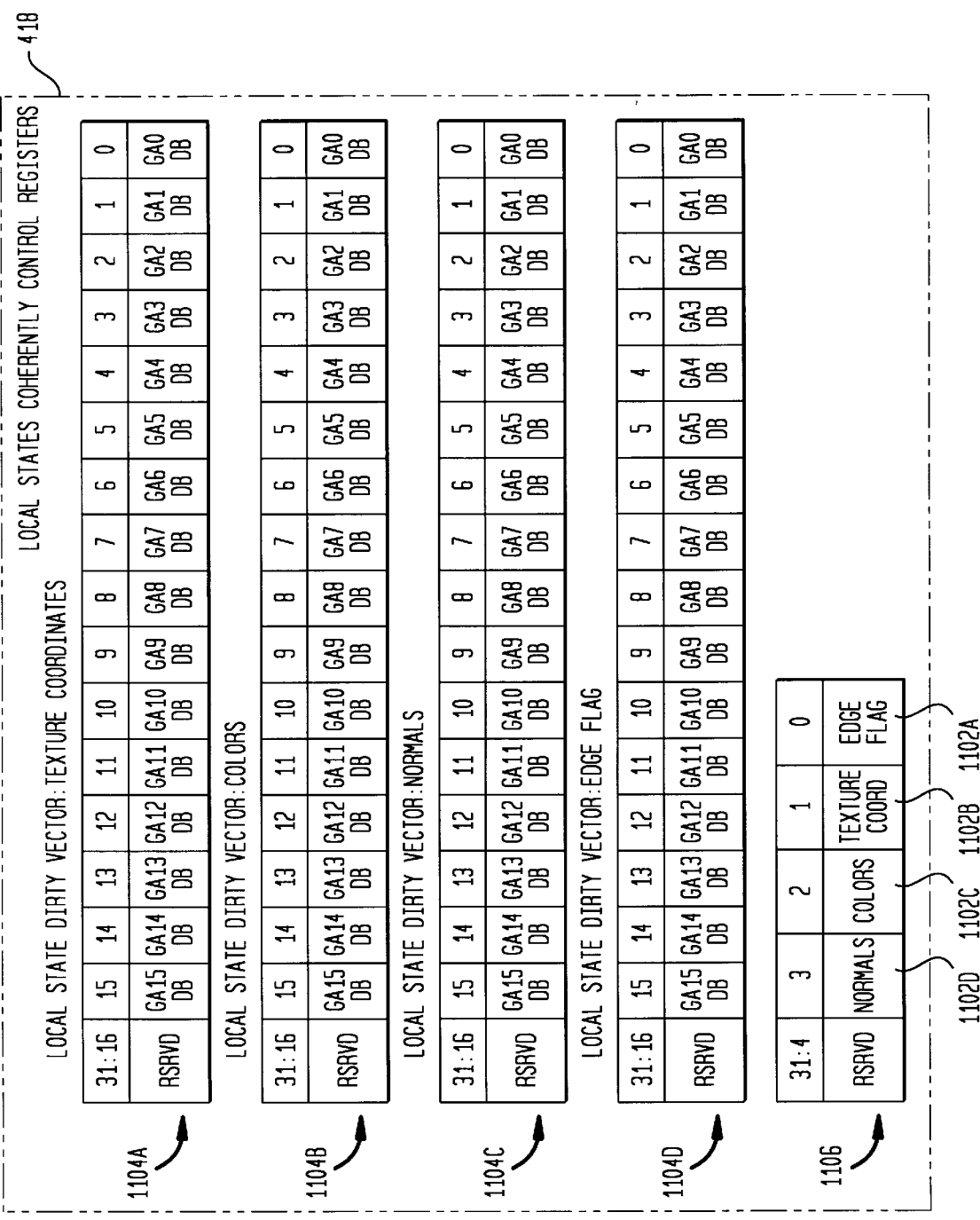
FIG. 11 is a diagram illustrating one embodiment of the local state coherency control registers of the present invention.

FIG. 11 is a schematic block diagram of the local state coherency control registers 418. With respect to local states, the parallel processing of primitive data by multiple geometry accelerators 120 presents two of the above coherency issues. First, like global states, a currently-effective local state value may have changed between the rendering of the two shared vertices. After a geometry accelerator transition occurs, each of the local state values will be resent to the geometry accelerators along with the associated shared vertices. Accordingly, in one embodiment of the present invention, there is a word 1106 that comprises local state dirty bits 1102, each associated with a specific local state. In the preferred embodiment wherein the graphics system operates in conformance with OpenGL, there is a dirty bit 1102 associated with each of the 4 local states shown in FIG. 7. That is, there is an edge flag dirty bit 1102A, a texture coordinate dirty bit 1102B, a color dirty bit 1102C, and a normal dirty bit 1102D. The coherency controller 402 sets these dirty bits when it is determined that the associated local state value has changed between shared vertices.

The second coherency issue noted above with respect to local states is that a geometry accelerator 120 may not have the currently-effective local state value and that the local state value is required to properly render a primitive. This is because, as noted above, the local states are provided only to the current geometry accelerator 120 and not to the other geometry accelerators in the graphics system 100. Thus, a next current geometry accelerator 120 will have a dated value for a local state which has changed since the last time that geometry accelerator was the current geometry accelerator. It should be understood that this circumstance may occur regardless of whether there are shared vertices.

To address this potential problem, in accordance with one embodiment of the present invention, there is a dirty vector 1104 associated with each of the local states. The local state dirty vectors 1104 each contain dirty bits, one associated with each of the geometry accelerators 120. Each dirty vector bit represents whether the associated geometry accelerator 120 contains the currently-effective value for the local state represented by the dirty vector 1104. In accordance with the local state definition described above, there is a local state dirty vector 1104A representing whether each of the geometry accelerators 120 contain the currently-effective value for the texture coordinates local state. Local state dirty vector 1104B represents whether each of the geometry accelerators 120 contains the currently-effective value for the color local state. Local state dirty vector 1104C represents whether each of the geometry accelerators 120 contains the currently-effective value for the normals local state. Local state dirty vector 1104D represents whether each of the geometry accelerators 120 contains the currently-effective value for the edge flag local state. As shown in FIG. 11, since there are a maximum of sixteen geometry accelerators 120 in the graphics system 100, each of the dirty vectors 1104 are 16 bits in length.

Referring again to FIG. 4, in one embodiment of the present invention the coherency controller 402 also accesses state registers 410 via control/data line 403 to selectively store and resend primitive data. FIG. 12 is a schematic block diagram of the state registers 410 utilized by the present invention. The state registers 410 include vertices-per-chunk registers 1202 for identifying an acceptable number of vertices which are to be included in each chunk of primitive data to minimize the number of shared vertices. In one embodiment of the present invention, the vertices-per-chunk (VPC) registers 1202 include three registers each containing a number of bits dedicated to a particular primitive type. Referring to FIG. 12, register VPC_0 is a 32-bit word having four 8-bit regions, each dedicated to the points, lines, line loop and line strip primitives, respectively. Likewise, register VPC_1 is a 32-bit word having four 8-bit regions, each dedicated to triangles, triangle strips, triangle fans and quad primitives, respectively. Finally, VPC_2 is also a 32-bit word with four 8-bit regions, two of which are dedicated to quad strip and polygon primitives. The GA state controller 202 determines the values to be written into the VPC registers 1202, which are read by other portions of distributor 118 to determine the number of vertices which are to be sent from the distributor 118 to the geometry accelerators 120 before an EOC is generated.

E. Operation

The following discussion will now address the manner in which selected vertex, global and local states (FIGS. 5, 6 and 7) are stored in the graphics state memory 414 (FIG. 8), the manner in which the coherency control registers 412 are maintained by the coherency controller 402 (FIG. 9) and the manner in which the GA state controller 202 resends the selectively stored primitive data to the geometry accelerators 120 (FIGS. 13–17, described below).

FIGS. 13–17 are tables summarizing the resend actions for the vertex, global and local states for each of the primitive types, including the order in which the resend actions occur. Primitive types which require the resending of similar primitive data are addressed in the same table. Accordingly, FIG. 13 is a table illustrating the resend global state, local state and vertex state actions for point, line, quadrilateral and triangle primitives after the occurrence of an EOC. FIG. 14 is a table summarizing the resend global state, local state and vertex state actions for line strip and line loop primitives after the occurrence of an EOC. FIG. 15 is a table summarizing the resend global state, local state and vertex state actions for polygon and triangle fan primitives after the occurrence of an EOC. FIG. 16 is a table summarizing the resend global state, local state and vertex state actions for quadrilateral strip and triangle strip primitives after the occurrence of an EOC. Finally, FIG. 17 is a table illustrating the resend global state, local state and vertex state actions for line loop primitives before the occurrence of a glEnd0 command.

1. Point, Line, Quadrilateral and Triangle Primitives

The point, line, quadrilateral and triangle primitive types, discussed above and illustrated in FIGS. 3A–3D, are generally referred to as independent primitives. The number of vertices which are required to render each of these primitives is 1, 2, 3, and 4, respectively. In a preferred embodiment of the present invention, the number of vertices which are included in a chunk of primitive data is specified by the coherency controller 402 such that each of these primitives are completely rendered by a single geometry accelerator 120. For example, when rendering triangle 305A, the VPC_1 register (bits 7:0) contains values which are an integer multiple of 3. As a result, vertices $v_0$, $v_1$ and $v_2$ are provided to the same geometry accelerator 120. The portion of the distributor 118 which determines when to generate an EOC will preferably consider the values stored in the VPC registers 1202 in addition to other criteria, such as the availability status of the geometry accelerators 120. As such, a single geometry accelerator will render triangle 305A and no vertices will be sent to a subsequent geometry accelerator 120. Since all the vertices are provided to a single geometry accelerator 120, there will be no shared vertices. It should be noted that this approach is due to the fact that these primitives do not have a common vertex and, preferably, have a finite number of vertices.

The storing of selected primitive data in the graphics state memory 414 for the rendering of simple primitives is described herein with reference to FIGS. 4 and 8. Referring to the vertex State column in the table of FIG. 8, the vertex state data is not required to be stored in the graphics state memory 414 for simple primitives. As noted, this is due to the fact that the number of vertices that are included in a chunk of primitive data is such that there is no need to resend vertices to a subsequent geometry accelerator 120. Thus, because there are no shared vertices, there is no need to store the vertex state data in the graphics state memory 414. It should be noted, however, that in alternative embodiments, the vertices-per-chunk may not be an integer multiple of the number of vertices which are required to render a single simple primitive. In such embodiments, there will be shared vertices and the simple primitives will be treated as line strips or triangle strips, depending on the number of shared vertices.

Referring to the Global State column of FIG. 8, the global states for simple primitives are also not required to be saved in the graphics state memory 414. In accordance with the present invention, global states are sent to all of the geometry accelerators 120 by the GA state controller 202. The proper global state will be effective for subsequent primitives rendered by subsequent geometry accelerators 120.

Referring to the Local State column of FIG. 8, the local state of the simple primitives is saved in the graphics state memory 414 by the coherency controller 402. The local state register 430 in the master state memory 420 is updated whenever a new local state value is received by the GA state controller 202. Because local states are provided only to the current geometry accelerator 120, a current geometry accelerator 120 may not have the currently-effective local state value when it is rendering a simple primitive. As noted, this condition may exist regardless of whether there are shared vertices. As a result, the local state may need to be resent to a new current geometry accelerator 120. However, because there are no shared vertices, there will not be a need to resend a next prior local state LS(n-2) to the geometry accelerators 120. As a result, there is no requirement to transfer the contents of the local state register 430 to the local state register 436 in the slave state memory 422.

The maintenance of the coherency control registers 412 for rendering simple primitives is now described with reference to FIGS. 9-11. Referring to the Global State Dirty Bits column of the table in FIG. 9, the global state dirty bits 1002 are not utilized for simple primitives because there is no coherency problems between shared vertices for these primitive types since there are no shared vertices. As such, the currently-effective global state value is available in each of the geometry accelerators 120.

Referring to the Local State Dirty vectors column, regardless of the primitive type, any time a local state is received from the host 108, the coherency controller 402 sets all of the bits in the corresponding dirty vector 1104 except for the bit associated with the current geometry accelerator 120. Subsequently, individual bits in the dirty vector 1104 will be cleared by the coherency controller 402 as the corresponding geometry accelerator 120 is updated with the latest local state values. This identifies all geometry accelerators 120 which have received the currently-effective local state. Accordingly, a dirty vector 1104 containing all zeros indicates that all of the geometry accelerators 120 have been updated with the currently-effective local state represented by the corresponding dirty vector 1104.

Referring to the Local State Dirty Bits column of FIG. 9, the local state dirty bits 1102 are not utilized when rendering simple primitives because these primitives are completely rendered by a single geometry accelerator 120. Since there are no shared vertices, there is no need to monitor the local states of shared vertices. Accordingly, maintenance of the local state dirty bits is not required.

Referring to FIG. 13, the resend global state, local state and vertex state actions for simple primitives after the occurrence of an EOC is described herein below. The table identifies what state is being resent ("Contains" column), where it is located in the GA state controller ("Resend" column), and the conditions under which the state data is resent ("When" column). As noted, the resending of primitive data is controlled by the vertex state controller 404, the global state controller 406 and the local state controller 408. These controllers interoperate to determine which primitive data to resend and when the primitive data is resent by accessing the currency control registers 412 through the coherency controller 402. As shown in the "Contains" column of FIG. 13, only the local state LS(n-1) is resent to the geometry accelerators 120 after an EOC. In other words, there are no global states or vertex states which are resent to the geometry accelerators 120 for the simple primitive types.

With respect to the vertex states, in a preferred embodiment there are no vertex state resend actions because the vertices-per-chunk registers 702 contain values for these primitives. This insures that all of the requisite vertices which are required to assemble a primitive are contained in a single chunk of primitive data. For example, the allowable vertices-per-chunk which are stored in the VPC_0 register for the line primitive contains an allowable number of vertices-per-chunk of 2, 4, 6, . . . vertices. On the other hand, for triangles, the allowable values for storage in the vertices-per-chunk registers is 3, 6, 9, . . . vertices. Because the vertices-per-chunk for simple primitives are arranged so as to be integer multiples of the requisite number of vertices for an individual primitive, there are no vertex states which need to be resent to a next current geometry accelerator 120 for simple primitive types after an EOC. This is consistent with the fact that no vertex states are stored in the graphics state memory 414 as noted above with reference to FIG. 8.

Likewise, because there are no shared vertices, there are no global states which need to be resent to the geometry accelerators 120 for the simple primitive types. As a result, as described above with reference to FIG. 8, there are no global states stored in the graphics state memory 414, and, as described above with reference to FIG. 9, the global state dirty bits are not utilized for simple primitives. Accordingly, there is no resend global state action for simple primitives after the occurrence of an EOC.

With respect to the local states, the prior local state LS(n-1) is resent to the geometry accelerators 120 when the corresponding bit of the local state dirty vector 1104 is set ("When" column). If the corresponding dirty vector bit is set, then, after one or more EOCs are sent to the geometry accelerators 120 to cause a different geometry accelerator 120 to become the new current geometry accelerator, the local state controller 408 causes the contents of the local state register 430 to be output from the graphics state memory 414 to the multiplexer 438. The coherency controller 402 controls the multiplexer of 438 so as to provide the stored local state to the geometry accelerators 120 before allowing the primitive data occurring after the EOC to pass through the GA state controller 202. That is, the coherency controller 402 prevents the subsequent primitive data from advancing through the multiplexer 438 until the local state LS(n-1) is forwarded to the geometry accelerators 120. This results in the new current geometry accelerator 120 receiving and storing the currently-effective local state value for each local state prior to rendering vertices.

2. Line Strip Primitives

Referring to FIG. 3E, a line strip primitive 310 is comprised of a number of individual line segments 309A–309E. As shown in FIG. 3E, each of the line segments have a common vertex with one or more neighboring line segments. It is the sharing of a single vertex that results in the individual lines 309A–309E forming a line strip 310. As a result, should an EOC occur during the rendering of line strip 310, then the vertex which was provided before the EOC will have to be resent to the new current geometry accelerator 120 in order to enable it to render a line between the shared vertex and a next subsequent vertex. For example, if the distributor 118 generates an EOC after vertex $v_3$, then the new current geometry accelerator 120 will need to receive that vertex for it to render line segment 309D between vertices $v_3$ and $v_4$.

The maintenance of the graphics state memory 414 with respect to the line strip primitive type is described herein with reference to FIG. 8. With respect to the vertex state, the vertex state register 426 in the master state memory 420 is updated by the coherency controller 402 whenever a new vertex is received by the GA state controller 202. This new vertex is identified by the coherency controller 402 which monitors the bus 110 and controls the storing of the vertex state in the graphics state memory 414. This vertex state is stored in the graphics state memory 414 because the vertex may need to be resent to the geometry accelerators 120 should an EOC occur before the next vertex is rendered. However, the contents of the master vertex state register 426 do not have to be transferred to the slave state memory 422 because there will never be more than one vertex shared between two geometry accelerators 120. As a result, should a prior vertex VS(n-1) have to be resent to the geometry accelerators, then that vertex state may be resent from the master vertex state registers 426.

Referring to the Global State column of FIG. 8, the global state is not required to be stored in the graphics state memory 414 for the line strip primitive. Although there may be one shared vertex when rendering a line strip primitive, the global state associated with that shared vertex is provided to all of the geometry accelerators 120. As a result, if the next subsequent vertex has an associated global state which is different than that for the shared vertex, then the coherency controller 402 prevents the subsequent global state and vertex state from passing through the GA state controller 202. As will be explained in detail below, this enables the GA state controller 202 to resend the shared vertex VS(n-1) to the new current geometry accelerator 120. Since the new current geometry accelerator 120 will have the prior global state currently effective, the shared vertex will be rendered correctly by the new current geometry accelerator 120.

Referring to the Local State column of FIG. 8, the local state is stored in the graphics state memory 414 in the same manner as that described above with reference to the simple primitives. That is, the local state registers 430 are updated by the coherency controller 402 when a new local state is received by the GA state controller 202. As noted, this is because a new current geometry accelerator 120 may not have the correct local state values since the local states are provided only to the current geometry accelerator 120. However, since there is only one shared vertex, there is no need to transfer the local state contents from the master state memory 420 to the slave state memory 422 for line strip primitives. Should a new current geometry accelerator 120 not have the currently-effective local state value, then the local state controller 408 will forward the contents of the local state registers 430 in the master state memory 420 to the multiplexer 438.

The maintenance of the coherency control registers 412 for rendering the line strip primitive is discussed herein below with reference to FIGS. 9–11. Referring to the Global State Dirty Bits column, the global state dirty bits 1002 are not utilized for line strip primitives because there are no coherency problems between shared vertices since there is only one shared vertex. As a result, the global state dirty bits 602 are not utilized by the GA state controller 202 for the line strip primitive. Essentially, the global state does not have to be resent because it is sent to all of the geometry accelerators 120 in accordance with the present invention. When a line strip primitive is being rendered, the coherency controller 402 automatically resends the prior vertex before allowing additional primitive data to pass through the GA state controller 202. Thus, a subsequent current geometry accelerator 120 will have the proper global state value for rendering a shared vertex.

Referring to the Local State Dirty vector column, the local state dirty vectors are set and cleared for line strip primitives in the same manner as described above for simple primitives. That is, the bits of the local state dirty vectors 1104 are all set except for that bit which is associated with the current geometry accelerator when a new local state value is received by the GA state controller 202. The bits are individually cleared as the associated geometry accelerator 120 is updated. Thus, the new current geometry accelerator 120 will have the currently-effective local states to properly render the shared vertex. The local state dirty bits, however, are not utilized by the GA state controller 202 for the line strip primitive since there is only one shared vertex.

Referring to FIG. 14, the resend global state, local state and vertex state actions for line strips after the occurrence of an EOC are described herein below. The table identifies what state is being resent ("Contains" column), where it is located in the GA state controller ("Resend" column), the conditions under which the state data is resent ("When" column), and the relative sequence that the state data is resent ("Order" column). The local state controller 408 determines, after the occurrence of an FOC during the rendering of a line strip, whether any bit in a local state dirty vector 1104 which corresponds to the current geometry accelerator 120 is set. If so, then the local state controller 408 resends the local state LS(n-1) to update the current geometry accelerator 120 with the currently-effective local state value. The local state controller 408 controls the graphics state memory 414 through the control line 413 to cause the contents of the local state register 430 in the master state memory 420 to be output to the multiplexer 438.

As shown in FIG. 14, whenever there is an EOC during the rendering of a line strip primitive, the vertex state VS(n-1) is always resent to the geometry accelerators 120 ("When" column). This determination is made by the vertex state controller 404 which causes the vertex state registers 426 in the master state memory 420 to be output to the multiplexer 438. As noted above with reference to FIG. 8, the vertex state is stored in master state memory each time it is received. As shown, the controllers interoperate such that the local state controller 408 resends the local state LS(n-1) before the vertex state controller 404 resends the vertex state VS(n-1). The coherency controller 402 controls the multiplexer 438 through control line 417 to enable the stored local and vertex states to be resent to the geometry accelerators 120 before a new global state, local state or vertex state are allowed to proceed to the geometry accelerators 120. As a result, the new current geometry accelerator 120 will have the proper global and local states to render the shared vertex.

3. Quadrilateral Strip and Triangle Strip Primitives

As described above with reference to FIGS. 3F and 3G, triangle strip 312 is a linked strip of triangles 311 which the quadrilateral strip 314 is a linked strip of quadrilaterals 313. The neighboring triangles and quadrilaterals have two shared vertices and therefore share a common side with at least one neighboring triangle or quadrilateral. As a result, when an EOC occurs during the rendering of a triangle strip or quadrilateral strip primitive, two vertices will need to be resent to the new current geometry accelerator 120 to enable it to render subsequent triangles or quadrilaterals. In addition to the two shared vertices, global and local state values may also need to be resent to enable the new current geometry accelerator 120 to properly render the shared vertices. Because these two primitive types require the sharing of two vertices, and because the shared vertices are the two prior vertices. These two primitive types are addressed together.

The maintenance of the graphics state memory 414 with respect to triangle strip and quadrilateral strip primitives is described herein below with reference to FIG. 8. Referring to the vertex State column, the coherency controller 402 updates the master state memory 420 with the vertex state each time a new vertex state is received from the host 108. In addition, the contents of the master vertex state register 426 are also transferred to the slave vertex state register 432 when a new vertex is received since the master vertex state register 426 will have to store the next vertex state which is received by GA state controller 202. It should be noted that when the vertex which is received is the last vertex in a chunk of primitive data, no additional vertex states are going to be received by the GA state controller 202 and the vertex state previously stored in the master vertex state register 426 will remain associated with the prior system state; that is, VS(n-1). Under these conditions, the contents of the master vertex state registers 426 are not also transferred to the slave vertex state registers 432. As a result, the graphics state memory 414 stores the vertex state associated with the prior system state, VS(n-1), and the vertex state associated with the next prior vertex state, VS(n-2), if any.

Referring to the Global State column of FIG. 8, the master global state registers 428 will be updated by the coherency controller 402 each time a new global state is received by the GA state controller 202 for quadrilateral and triangle strip primitives. When the coherency controller 402 determines that a new global state has been received, it stores the global state value in the master global state register 428. When a vertex is received, the global state value is then copied to the slave global state register 434. This process occurs for all new global states which are followed by a vertex state except when the vertex is the last vertex in a chunk of primitive data. As a result, the master global state register 428 will contain the global state associated with the previous system state. GS(n-1) and the slave global state register 434 will then have the global state associated with the next previous system state, GS(n-2).

Referring to the Local State column of FIG. 8, the local state register 430 in the master state memory 420 is updated by the coherency controller 402 whenever any new local state is received by the GA state controller 202. The contents of the local state register 430 are transferred to the local state register 436 in the slave state memory 422 when a new vertex which is not the last vertex in a chunk of primitive data is received. Thus, the graphics state memory 414 will contain the local state associated with the prior system state, LS(n-1), stored in the master vertex state register 430 and the local state associated with the next previous system state, LS(n-2), stored in the slave vertex register 432.

The maintenance of the coherency control register 412 for the quadrilateral strip and triangle strip primitives is discussed herein below with reference to FIG. 9. Referring to the Global State Dirty Bit Column, the coherency controller 402 sets the global state dirty bits 1002 when a new global state is received by the GA state controller 202. The global state dirty bits 1002 are cleared upon the receipt of each vertex except for the last vertex before an EOC. In addition, the global state dirty bit is cleared when the coherency controller 402 determines that a glEnd() command was received by the GA state controller 202. Thus, in accordance with the present invention, the global state dirty bits indicate that the global state is different for each of the shared vertices.

Referring to the Local State Dirty vector column in FIG. 9, the local state dirty vectors for the quadrilateral and triangle strip primitives are managed in the same manner as that described above for the other primitive types. All of the local state dirty vector bits except that associated with the current geometry accelerator are set when a new local state is received by the GA state controller 202. The dirty vector bits are individually cleared by the coherency controller 402 when the associated geometry accelerator is updated with the currently-effective local state value.

Referring to the Local State Dirty Bits column, the local state dirty bits are utilized in the same manner as the global state dirty bits. This results in the local state dirty bit indicating when the value of a local state is different between shared vertices. The local state that was currently active for each of the shared vertices will be resent with the associated shared vertex.

The resend global state, local state and vertex state actions for triangle and quadrilateral strips after the occurrence of an EOC is described hereinbelow with reference to FIG. 15. The table identifies what state is being resent ("Contains" column), where it is located in the GA state controller ("Resend" column), the conditions under which the state data is resent ("When" column), and the relative sequence that the state data is resent ("Order" column). When any global state dirty bit 1002 is set, then the associated global state was different for each of the shared vertices. The contents of the corresponding slave global state register 434 is resent to the geometry accelerators by the global state controller 406. As noted above, the slave state memory 422 contains the global state value GS(n-2) because there was a transfer of global state data from the master state memory 420 to the slave state memory 422 when a new vertex was received by the GA state controller 202. After this global state is resent, then the proper local state is resent to the geometry accelerators 120.

The local state controller 408 accesses the coherency control registers 412 to determine whether the corresponding bit of the local state dirty vector 604 is set while the local state dirty bit 1102 is not set. This indicates that the new current geometry accelerator 120 does not have the currently-effective local state but there is no difference in the local state between the shared vertices. Accordingly, the local state controller 408 resends the contents of the master local state register 430 which contains the latest local state value. However, if the local state dirty bit 602 is set, then there is a difference for the local state between shared vertices. The local state controller 408 resends the contents of the slave local state register 436 containing the local state value LS(n-2).

As shown in FIG. 15, after the global state GS(n-2) is resent (if necessary) and either the local state LS(n-1) or the local state LS(n-2) (if necessary) is sent, then the vertex state controller 404 resends the vertex state VS(n-2) located in the slave vertex state register 432. This vertex is always sent because, as noted, there are two shared vertices between old and new current geometry accelerators 120 which are rendering a triangle or quadrilateral strip primitive type. After this vertex state VS(n-2) is resent to the geometry accelerators 120, then the second shared vertex is addressed. If a global state dirty bit was set, the global state value appropriate for the first shared vertex was resent at step 1. However, as noted, the global state value for the shared vertices is different when the global state dirty bit is set. As a result, the global state GS(n-1) located in the master global state register 428 is always resent to the geometry accelerators when the associated global state dirty bit 1002 is set. Once the prior global state GS(n-1) is resent, then the local state controller 408 determines whether the local state dirty bit 1102 is set, and, if so, the local state controller 408 resends the contents of the master local state register 430, which includes the local state LS(n-1). After the determination is made to send the global state GS(n-1) and the local state LS(n-1), then the vertex state controller 404 forwards the contents of the master vertex state registers 426 to the geometry accelerators 120, which includes the vertex state VS(n-1).

4. Polygon and Triangle Fan Primitives

As discussed above with reference to FIG. 3H, a polygon primitive is a multi-sided convex polygon. As shown in FIG. 3H, when an EOC occurs during the rendering of a polygon primitive, the original vertex and the last vertex must be resent to a new current geometry accelerator so that the closed polygon may be rendered. For example, referring to FIG. 3H, if an EOC occurs after vertex $v_3$, then vertex $v_0$ and vertex $v_3$ must be resent in order to render triangle 305B. With respect to triangle fan primitives, a series of triangles are drawn using the initial vertex, $v_0$, as a common vertex. Neighboring triangles and the triangle fan also share a second vertex. Because these two primitive types require the sharing of two vertices, the initial vertex, $v_0$, and the prior vertex-$v_{n-1}$, these two primitive types are addressed together.

Referring to FIG. 8, the maintenance of the graphics state memory 414 with respect to the rendering of polygon and triangle fan primitives is described herein below. Referring to the vertex State column, the coherency controller 402 updates the master state memory 420 with each new vertex state. However, unlike the other primitives, the contents of the master vertex state register 426 is transferred to the slave vertex state register 426 is transferred to the vertex state register 432 only when the first vertex after a glBegin() command is received. This vertex, $v_0$, is then retained within the slave state memory 422 since it will be needed to completely render the polygon and triangle fan primitives if they are broken up with an EOC. Subsequent new global states will be stored in the master vertex state register 426 and not copied to the slave vertex state register 426.

Referring to the Global State column of FIG. 8, the master state memory 420 is updated with each new global state which is received by the GA state controller 202 when rendering polygon and triangle fan primitives. Like the vertex state, the contents of the master global state register 428 is transferred to the slave global state register 434 only when the GA state controller 202 receives the first vertex after a glBegin() command. Similarly, the local state is treated in the same manner.

The maintenance of the coherency control registers 412 for polygon and triangle for primitives is described hereinbelow with reference to FIG. 9. Referring to the Global State Dirty Bit column, the coherency controller 402 sets the global state dirty bit 1002 whenever a new global state value is received by GA state controller 202. This dirty bit is cleared when a first vertex after a glBegin() command is received and when a glEnd() command is received. Thus, when rendering polygon and triangle fan primitives, the global state dirty bits indicate whether the global state for the initial vertex, $v_0$, is different than the global state value for the other shared vertex, $v_{n-1}$.

Referring to the Local State Dirty Bit vector column, the local state dirty vectors are set in the same manner as that described above for the other primitive types. This is because the current geometry accelerator 120 may not have the currently-effective local state value regardless of whether these are shared vertices.

Referring to the Local State Dirty Bits column, the local state dirty bits are set when a new local state is received by the GA state controller 202 and are cleared upon receipt of the first vertex after a glBegin() command. Thus, like the global state dirty bits, the local state dirty bits indicate when the local state which was effective for the initial vertex, $v_0$, is different than the local state for the other shared vertex, $v_{n-1}$.

Referring to FIG. 16, the resend global state, local state and vertex state actions for polygon and triangle fan primitives after the occurrence of an EOC are discussed herein below. The table identifies what state is being resent ("Contains" column), where it is located in the GA state controller ("Resend" column), the conditions under which the state data is resent ("When" column), and the relative sequence that the state data is resent ("Order" column). When any global state dirty bit 1002 is set, then the associated global state was different for each of the shared vertices. The global state controller 406 resends the corresponding slave global state register contents 434 to the geometry accelerators 120. As noted, the slave state memory 422 contains the global state GS(0). Then, the local state controller 408 determines whether a prior local state is to be resent to the geometry accelerators 120. When the corresponding bit of the local state dirty vector 1104 is set and the local state dirty bit 1102 is not set, then the current geometry accelerator 120 does not have the currently-effective local state. The local state controller 408 sends the contents of the corresponding master local state register 430 to the geometry accelerators 120. As noted, the master state memory contains the local state LS(n-1). However, if any of the local state dirty bits 206 are set, then the local state for the shared vertices are different. The corresponding slave local state register 436 is forwarded to the geometry accelerators 120. The local state register 436 contains the local state LS(0). Once it is determined to send the global state GS(0) and a prior local state LS(n-1) or LS(0), then the initial vertex $v_0$ located in the slave state memory 422 is resent to the geometry accelerators 120 at step 3, by vertex state controller 404.

The second shared vertex is then addressed at steps 4–6. When any global state dirty bit 1002 is set, then the global slave value appropriate for the resent initial vertex is different than the global state associated with the second shared vertex. As a result, the contents of the master global state register 428, GS(n-1), are sent to the geometry accelerators 120. Then, if any local state dirty bit 1102 is set, then the corresponding master local state register contents containing local state LS(n-1) are resent to the geometry accelerators 120. Subsequently, the previous vertex state VS(n-1) stored in the master vertex state registers 426 are resent to the geometry accelerators 120.

5. Line Loop Primitive

As discussed above with reference to FIG. 3J, a line loop primitive contains a series of connected line segments with the last line segment connecting the last and initial vertices.

As shown in FIG. 8, due to the requirement that the initial vertex, $v_0$, and the last vertex, $v_{n-1}$ are required to render the last vertex of the line loop, the maintenance of the graphics state memory 414 for the line loop primitive is the same as that for the polygon and triangle fan primitives. Likewise, the coherency control registers 412 are maintained in the same manner as the polygon and triangle fan primitives as shown in FIG. 9. In addition, referring again to FIG. 14, the resend global state, local state and vertex state actions for line loops after the occurrence of an EOC is identical to that as explained above for the line strip primitives because the line segments of the primitive have a single shared vertex.

However, because one of the shared vertices is the initial vertex, then there is a series of resend actions which occur before the occurrence of a glEnd() command. These resend actions, which are summarized in FIG. 17, are similar but not identical to those performed for the polygon and triangle fan primitives described above with reference to FIG. 16. Steps 4 and 5 are performed simply to place the geometry accelerators in the proper state for rendering future primitives.

The following examples will further clarify the functions of the present invention. These examples are described with reference to FIGS. 18–20. FIG. 18, comprising FIGS. 18A and 18B, is a table illustrating the steps performed by the present invention to render a triangle strip primitive when a local state is changed during the rendering of the primitive. This example illustrates the use of the local state coherency control registers 418. In this example, there are a total of four geometry accelerators 120 in the front-end subsystem 102. The number of vertices in each chunk of primitive data is set to be six vertices in the VPC_1 register, bits 15:8, of VPC registers 1202 (FIG. 2). Referring to the table in FIG. 18, the "Step" column provides the sequential steps in this exemplary process. The "From Host" column illustrates the primitive data which is received by the GA state controller 202 from the host 108 over bus 110. The primitive data which is sent to the geometry accelerators 120 by the GA state controller 202 is shown in the "TO GAs" column. The "Current GA" column identifies the current geometry accelerator 120 which is to receive the primitive data generated by the GA state controller 202. The "Local State Coherency" column illustrates the values of the bits in a local state dirty vector 1104 and the local state dirty bits 1102. The dirty bit vector is arranged left-to-right from most significant bit to least significant bit the position of the bit corresponding to the geometry accelerator. Finally, the "vertex Count" column identifies the current vertex count; that is, the number of vertices which have been sent for a given chunk of primitive data.

In some prior step X there was a new local state data, LS(X), sent to the GA state controller 202 from the host 108. When this local state LS(X) is received by the GA state controller 202, the coherency controller 402 sets the associated dirty vector bits for each of the geometry accelerators 120 except for the current geometry accelerator, GA1. The associated local state dirty vector 1104 has four bits each associated with one of the four geometry accelerators in the front-end subsystem 102. As shown at step X, bits 0, 2 and 3 are set to 1 indicating that the associated geometry accelerators 2, 3 and 4 do not have the currently-effective value for that local state.

Some time later at step 1, the host 108 generates a glBegin(GL_TRIANGLE_STRIP) command which is received by the GA state controller 202 and forwarded to the geometry accelerator 120 by the coherency controller 402. The current geometry accelerator is still the first GA and the dirty vector and dirty bits have not changed.

At steps 2 through 7, vertices VS(0) through VS(5) are received by the GA state controller 202 from the host 108. As each vertex is received, it is forwarded to the geometry accelerators 120 through the multiplexer 438 by the coherency controller 402. Although not shown in the Figure, it is understood that the coherency controller 402 is saving the selected primitive data in the graphics state memory 414 as described above. The vertices VS(0) through VS(5) are six vertices ("vertex Count" column) which are provided to the current geometry accelerator GA1 ("Current GA" column). When VS(0) is forwarded to the current geometry accelerator, the dirty bit 1102 associated with the local state is set to zero indicating that the currently-effective value for the local state property is GA(1).

At step 7, the vertex state VS(5) is the last vertex in the chunk of primitive data which is provided to the current geometry accelerator GA1 because the vertices-per-chunk has been set to be six vertices as described above. Thus, the distributor 118 generates one or more EOCs to advance the current geometry accelerator from GA1 to a different geometry accelerator 120. In this example, the third geometry accelerator, GA3, has been selected by the distributor 118 to be the next current geometry accelerator 120. Accordingly, at steps 8 and 9 the distributor 118 generates two EOCs. At step 8, the EOC which is sent to the geometry accelerators advances the current geometry accelerator from GA1 to GA2 ("Current GA" column). The transmission of the EOC at step 9 advances the current geometry accelerator from GA2 to GA3 ("Current GA" column). The vertex VS(6) that has been sent from the host at step 8 (column 2) is prevented from advancing to the geometry accelerators 120 by coherency controller 402 through the control of the multiplexer 438. The vertex VS(6) will not be forwarded to the geometry accelerators 120 until all of the requisite EOCs are sent to the geometry accelerators and the shared vertices (and possibly global and local state values) are resent in accordance with the present invention.

After the EOCs are sent at steps 8 and 9, the third geometry accelerator GA3 is now the current geometry accelerator 120. As noted, the dirty vector bit associated with GA3 of the corresponding local state dirty vector 604 is set. This indicates that the now current geometry accelerator 120 needs to be updated for the corresponding local state value. Also, the corresponding local state dirty bit is clear indicating that the shared vertices have the same value for the subject local state. That is, the corresponding local state has not changed between the shared vertices (VS(4) and VS(5)). As a result, the new current geometry accelerator, GA3, simply needs to be provided with the latest local state, LS(X), since when that local state value was sent to the geometry accelerators it was only sent to the then current geometry accelerator GA1. Thus, at step 10, the latest local state, LS(X), is resent to the now current geometry accelerator GA3. The corresponding bit in the local state dirty vector 604 is cleared. Once the new current geometry accelerator, GA3, has been provided with the currently-existing local state value, LS(X), then the shared vertices may be resent to the geometry accelerator GA3. Accordingly, as described above, the vertex state controller 404 resends the vertex state VS(4) (which is VS(n-2) where n is equal to 6) at step 11, and VS(5) (which is VS(n-1), where n is equal to 6) at step 12.

Note that during steps 8 through 12 whereat the EOCs and resending of primitive data occurs, the vertex VS(6) is not forwarded to the geometry accelerators 120 by the coherency controller 402. It is not until step 13 that this vertex, VS(6), is sent to the new current geometry accelerator GA3.

Steps 11 through 15 illustrate a sequence of vertices, VS(4) through VS(8), being sent to the geometry accelerator GA3. As shown in vertex Count column, VS(8) is the fifth vertex in this chunk of primitive data.

At step 16, a new local state, LS(9), is received from the host 108. This causes every bit in the local state dirty vector 604 to be set, except for that of the current geometry accelerator, GA3. As described above, because the vertex VS(9) is the last vertex in a chunk of primitive data, the corresponding local state dirty bit 602 is set. At step 17, the last vertex in this chunk of primitive data; that is, the last vertex before the occurrence of one or more EOCs, is received and forwarded to the current geometry accelerator 120.

In this exemplary embodiment, the next current geometry accelerator 120 is geometry accelerator GA0 ("Current GA"

column). Only one EOC is sent by the distributor 118 to the geometry accelerators 120 to change the current geometry accelerator from GA3 to GA0. This occurs at step 18.

Referring to the Local State Coherency column, the local state dirty bit associated with the local state LS is set at step 16. As noted above, this bit is set when a new local state is received by the coherency controller 402 and cleared with each vertex except the last vertex in a chunk of primitive data. This identifies these shared vertices which have a different local state value.

As noted, for triangle strip primitives, there are two shared vertices. Here, these vertices are VS(8) (step 15) and VS(9) (step 17). Because of the occurrence of the new local state value LS(9) at step 16, these two shared vertices are to be rendered with different local state values. As described above, there is a transfer of local state data from the master state memory 420 to the slave state memory 422 when a new vertex which is not the last vertex of a chunk is received by the GA state controller 202. Thus, the graphics state memory 414 contains the local state LS(X) in the slave local state register 436 and the local state LS(9) in the master local state register 430.

When the local state dirty bit 1102 is set, then the local state controller 408 resends the slave and master local state register contents. The local state LS(X) must be resent before the first shared vertex, VS(8), since it is different than the local state value currently stored in the current geometry accelerator. Thus, at step 19, the local state LS(X) is resent to the new current geometry accelerator GA0. Then, at step 20, the first shared vertex, VS(8), is sent to the current geometry accelerator GA0. As shown in the vertex Count column, VS(8) is the first vertex in this new chunk of primitive data being provided to the new current geometry accelerator.

The second of the two shared vertices, VS(9), is then resent to the current geometry accelerator GA0. Here too, the local state associated with the shared vertex must first be sent to the geometry accelerator GA0 since it is different than the local state associated with the first shared vertex. Accordingly, at step 21, LS(9) is sent to the current geometry accelerator GA0 current. Then, at step 22, the second shared vertex, VS(9), is forwarded to the current geometry accelerator GA0. When the local state LS(9) is resent at step 21, the corresponding bit in the LS dirty vector 604 is cleared, to indicate that the geometry accelerator now has the currently-effective local state value.

The vertex, VS(10), which was received from the host 108 at step 18, was prevented from passing through the GA state controller 202 by the coherency controller 402. Once the above resending actions are accomplished at steps 19 through 22, this vertex is allowed to pass through to the current geometry accelerator 120. At step 24, the next vertex, VS(11), is then received and forwarded to the geometry accelerators 120. At step 25, a glEnd() command indicating the end of the sequence of primitive data for the strip primitive is received and forwarded at step 25.

An exemplary sequence of primitive data to render a series of line primitives such as those shown in FIG. 3B is provided in FIG. 19. The exemplary sequence begins when the host computer 108 sends a glBegin(GL_LINES) command to the GA state controller 202. The coherency controller 402 allows the glBegin() command to pass through the multiplexer 438 to the geometry accelerators 120. As shown by the shaded box in FIG. 19, the provision of the glBegin() command to all of the geometry accelerators 120 does not result in the rendering of a primitive. At steps 2 through 4, the global state, local state and vertex state for the vertex 0 are received from the host 108. As shown in FIG. 19, this primitive data is forwarded to the geometry accelerators 120 by the coherency controller 402. At steps 5, 6 and 7, a new global state, GS1, a new local state, LS(1), and vertex state, VS(1), are received from the host 108 by the GA state controller 202. This primitive data is also forwarded to the geometry accelerators 120 by the coherency controller 402. As shown in FIG. 19, a current geometry accelerator 120 renders the line 303A using the vertex and state data associated with vertices v(0) and v(1).

At step 8, the distributor 118 generates an EOC command to the geometry accelerators 120. As shown in FIG. 19, the generation of the EOC command does not result in the rendering of a primitive by the geometry accelerators 120. As noted above, for the line primitive there is no shared vertex state or global state since there are no shared vertices and the global state values are provided to all the geometry accelerators 120. However, the local state is stored in the master state memory 420 whenever a new local state is received by the GA state controller 202 and the appropriate bits in the local state dirty vector 1104 are set to identify which geometry accelerators have this local state value.

As a result, although in step 8 the GA state controller 202 received a new global state, GS2, from the host 108, the coherency controller 402 prevents that global state from passing through the multiplexer 38. During this time, the EOC command is sent to the geometry accelerators 120 and the prior local state LS(n-1) is resent to the new current geometry accelerator 120. As noted, although the global state GS1 is new, that global state was provided to all of the geometry accelerators 120 and does not need to be resent to the new current geometry accelerator. As a result, the current global state GS2 is then allowed to be forwarded to the geometry accelerators 120 by the coherency controller 402.

At steps 11 through 15, the remaining primitive data for vertices 2 and 3 are provided to the GA state controller 202 from the host 108 and, subsequently, to the geometry accelerators 120. As shown in FIG. 19, the steps 9 through 15 result in the current geometry accelerator rendering line 303B. In steps 16 through 21, the primitive data associated with vertices 4 and 5 are provided to the GA state controller 202 from the host 108 and, subsequently, to the geometry accelerator 120, to result in the rendering of line 303C by the same current geometry accelerator. Finally, at step 22, a glEnd() command is generated by the host 108 and forwarded all of the geometry accelerators 120 by the GA state controller 202 to complete this sequence of line primitives.

FIG. 20, which includes FIGS. 20A and 20B, is a table illustrating an exemplary primitive data sequence for rendering the quadrilateral strip 314 illustrated in FIG. 3G. At step 1, the host 108 generates a glBegin(GL_QUAD_STRIP) command which is received by the GA state controller 202 and forwarded to the geometry accelerators 120. As shown by the gray boxes at step 1 in FIG. 20, there are no primitives rendered by the geometry accelerators when the glBegin() command is received. At steps 2 through 13, the host computer 108 generates a series of primitive data for vertices $v_0$, $v_1$, $v_2$ and $v_3$. Each of these vertices have associated global states and local states which have values that are different than the global and local states of the preceding vertex. Thus, a global state GS(0) and a local state LS(0) are associated with vertex state VS(0) state for vertex $v_0$, while global state GS(1) and local state LS(1) are associated with vertex state VS(1) for vertex $v_1$. The same is true for vertices $v_2$ and $v_3$. The GA state controller 202 forwards these vertices to the then current geometry accelerator 120 to render the quadrilateral 313A.

At steps 14 through 19, a similar sequence of primitive data is provided by the host 108 and sent to the geometry accelerators 120 for vertices $v_4$ and $v_5$. As shown on the right-hand side of FIG. 20, vertices $v_2$, $v_3$, $v_4$ and $v_5$ are used by the current geometry accelerator to render quadrilateral 313B. As shown by the overlapping rectangles in FIG. 20, vertices $v_2$, and $v_3$ are shared by the quadrilateral 313A and the quadrilateral 313B. This is also illustrated in FIG. 3G.

At step 20, the distributor 118 generates an EOC to advance to a new current geometry accelerator 120. As shown by the gray block at step 20, there is no rendering of primitives by the geometry accelerators 120 during the receipt of the EOC command. As discussed above, the prior two vertex states and the associated global and local states, if necessary, are saved in the graphics state memory 414 for the quadrilateral strip primitives. Thus, because the global and local states are different for each vertex by step 20, the graphics state memory 414 has stored the previous primitive data VS(n-1), GS(n-1) and LS(n-1) in master state registers 426, 428 and 430, respectively; and the next prior primitive VS(n-2), GS(n-2) and LS(n-2) in slave state registers 432, 434 and 436, respectively. For the same reasons, the associated global and local state dirty bits are set by step 20. This indicates that the global and local states for the two shared vertices is different. In other words, the global state for the vertex $v_4$ (GS(4)) is different than the global state for the vertex $v_5$ (GS(5)), and the local state for the vertex $v_4$ (LS(4)) is different than the local state for the vertex $v_5$ (LS(5)). Also, the local state dirty vector 1104 associated with the local state shown in FIG. 20 will have all of its bits set by the coherency controller 402 except for that bit associated with the geometry accelerator which is the current geometry accelerator 120 before the EOC is generated at step 20. As a result, this bit identifies the condition wherein the next current geometry accelerator is not aware of the currently-effective local state value.

After the transmission of the EOC command, the GA state controller 202 resends the selected primitive data in accordance with the present invention. Since the associated global state dirty bit is set, the global state GS(n-2) is resent. In the exemplary sequence shown in FIG. 20, this is global state GS(4).

After the global state controller 406 sends global state GS(4), the resending of a prior local state value is determined. If the current geometry accelerator does not have the currently-existing local state value and there is no difference between the local states for the two shared vertices, then the local state controller will send the prior local state, LS(n-1), stored in the local state register 430 in the master state memory 420. This condition is represented by the corresponding bit of the LS dirty vector 1104 being set while the local state dirty bit 1102 is not set. However, if the local state dirty bit 1102 is set as in this example, then the first shared vertex must be sent since it is different than the local state for the second shared vertex. Accordingly, the local state LS(n-2) is resent. In the illustrative embodiment illustrated in FIG. 20, this is local state LS(4).

Once it is determined by the global state controller 406 whether to send the global state GS(n-2) and after the local state controller 408 determines whether it should send the local state LS(n-1) or local state LS(n-2), then the vertex state controller 404 sends the first shared vertex VS(n-2). In the exemplary sequence shown in FIG. 20, this is vertex state VS(4). Accordingly, at step 23, the GA state controller 202 resends the vertex state VS(4) to the geometry accelerators 120.

Once the first shared vertex and its associated global and/or local state values have been resent to the geometry accelerators 120, then the GA state controller 202 addresses the resending of the second shared vertex, VS(n-1). Since the associated global state dirty bit 1102 is sent, the global state controller 406 resends the global state associated with the first shared vertex. As a result, the global state for the second shared vertex must also be sent prior to sending the shared vertex itself. Accordingly, the global state, GS(n-1), is resent to the geometry accelerators 120. In the exemplary sequence shown in FIG. 20, this is global state GS(5), resent at step 24.

If it was determined that a local state dirty bit 602 was set, then the local state controller 408 resent the local state associated with the first shared vertex. As a result, the local state associated with the second shared vertex must also be resent to the geometry accelerators prior to the second shared vertex. Thus, since the associated local state dirty bit 1102 is set, then the local state LS(n-1) is resent. In the exemplary sequence shown in FIG. 20, this is local state LS(5), resent at step 25. Once the global and local states for the second shared vertex are addressed by the GA state controller 202, then the vertex state for the second shared vertex, VS(n-2), is resent to the geometry accelerators. In the exemplary sequence of FIG. 20, this is performed at step 26 wherein the vertex state VS(5) is resent to the geometry accelerators.

It is not until the above sequence of resending selected primitive data does the coherency controller 402 allow the global state GS(6) received from the host 108 at step 20 to proceed through the multiplexer 438 to the geometry accelerators 120. The remaining local and global states for vertices $v_6$ and $v_7$ are received from the host 108 and sent to the geometry accelerators 120 at steps 28 through 32. As shown at FIG. 20, the resent primitive data associated with vertices $v_4$ and $v_5$ and the primitive data associated with vertices $v_6$ and $v_7$ are used by the new current geometry accelerator 120 to render quadrilateral 313C. Subsequently, at step 33, a glEnd() command is issued from the host 108 and forwarded to the geometry accelerators 120 by the GA state controller 202.

F. Managing Dependencies of Local and Global States

With sophisticated graphics hardware systems such as the graphics system 100 and flexible graphics interfaces such as OpenGL, additional capabilities of the API beyond the direct setting of local and global states may be provided to the graphics application. For example, with the OpenGL API, the color of the material property global states may track, or be linked, to the color local state. Such a linking of properties may be desired, for example, when a single material property parameter for most vertices in a scene is required to be changed, and will consistently have the same value.

As noted, in one preferred embodiment the graphics system 100 operates in accordance with the OpenGL API standard and the global states include the OpenGL material properties of the objects in a scene which include the front and back facing ambient, diffuse and specular colors, the shininess and emission. The command for setting the material properties, the glMaterial() command, specifies a current material property for use in lighting calculations. There are a number of rules associated with the setting of material properties which are considered to be well known in the art and are fully described in the OpenGL Programming Guide and the OpenGL Reference Manual incorporated by reference above.

Typically, different material properties may be assigned for different vertices on the same object. More likely, however, there are multiple objects on a given scene and each object has different material properties. The value of a material property may be changed directly through the generation of the glMaterial() function call introduced above. However, there is a performance cost associated with the glMaterial() function call. Accordingly, a technique for minimizing performance costs associated with changing material properties state is to use the glColorMaterial() function call. The glColorMaterial() function call is specified:

glColorMaterial (GLenumface, GLenum mode)

This function call causes the material property or properties specified by the mode of the specified material face or faces specified by face to track the value of the current color at all times. Accordingly, a change in the current color using the glColor() command, immediately updates the specified material properties. The face parameter can be GL_FRONT, GL_BACK or GL_FRONT_AND_BACK while the mode parameter can be GL_AMBIENT, GL_DIFFUSE, GL_AMBIENT_AND_DIFFUSE, GL_EMISSION and GL_SPECULAR.

After calling the glColorMaterial(), the glEnable() command with GL_COLOR_MATERIAL as the parameter (glEnable(gl_Color_Material) is required to be called to enable the linking functionality. Thereafter, to change the value of the color property as well as the linked material property or properties is achieved simply with the generation of the glColor() function call. This provides the same functionality as generating both, the glColor() and glMaterial() commands. In addition to saving time and bandwidth, linking one or more material property global states with the color local state may be temporarily enabled and disabled throughout the rendering of a scene providing significant flexibility in the drawings of the scene.

This indirect control of property states may result in the geometry accelerators 120 not being provided with the proper information to properly render a vertex. Due to the fact that there are local states that are not provided to all of the geometry accelerators 120, and that local and global state values may be linked to each other, those geometry accelerators 120 which are not the current geometry accelerator may not be provided with the necessary information to properly render global states. The circumstances under which this arises and the functions and operations of the present invention to insure the proper rendering of vertices by the geometry accelerators 120 while maximizing the benefits associated with the parallel distribution of primitive data across multiple geometry accelerators is described below with reference to the linking of the color local state and the color material global state in the OpenGL API. It should be understood, however, that the following description applies to any linked local and global states in any API that may be implemented in the graphics system 100. Furthermore, as will become apparent to one skilled in the art, the following functions and operations may be modified to accommodate the linking of other types of states in systems implementing more that the local and global state described herein without deviating from the scope of the present invention.

When the color local state and a material property global state are linked, the color local state is referred to as the determining state or property while the material property global state is referred to as the dependent state or property. The color established by the glColor() function call will be the color value assigned to the dependent material state(s). This will occur regardless of whether an EOC occurs during the rendering of the primitive stream. When a chunk of primitive data which is provided to the current geometry accelerator 120 includes a 10 color local state change, the current geometry accelerator 120 is aware of the linking of the selected material state(s) and will therefore change the color of the material state(s) as well. As noted, when an EOC occurs and a new current geometry accelerator 120 is determined, the color, as a local state, will be automatically resent by the coherency controller 402 and local state controller 408 since the color has changed. The new current geometry accelerator 120 also receives the glColorMaterial() function call since, as noted above, all function calls are provided to all of the geometry accelerators 120. The new current geometry accelerator 120 then automatically applies the new color to the linked material state(s). As a result, the vertices will be properly rendered by the new current geometry accelerator 120.

However, when the color and the material state are no longer bound, due to the receipt of a glDisable() function call prior to the generation of an EOC, the new current geometry accelerator 120 will not be current. Specifically, the new current geometry accelerator will not be aware of the change in color assigned to the previously-linked material state by the prior current geometry accelerator 120 due to the previous linking of the material state and color properties. Since the material property had changed due to the color change, the new geometry accelerator 120 will not apply the same linking because of the glDisable() command having been generated prior to the EOC. As a result, the new current geometry accelerator will not assign the proper color to the previously-mapped material property.

Consider the sequence of events illustrated in FIGS. 21A–21B. In the exemplary sequence, the front emissive material state (a global state) is linked to the color changes (a local state) with the glColorMaterial command. The line primitives are independent primitives; that is, they do not have a common vertex; they are unconnected line segments. There are two current geometry accelerator 120, GA1 and GA2. The OpenGL commands received by the driver from the graphics application is provided in the "From Host" column while the driver commands to the graphics system 100 without implementing the present invention is shown in the "To GAs" column. The state of the current geometry accelerator 120 is shown in the "GA State" column.

At step 1 the command glColorMaterial (GL_FRONT, GL_EMISSION) is received from the driver on the host 100. Then, at step 2, the command glEnable (GL_COLOR_MATERIAL) is received. These two function calls cause the emissive material property to be linked to the glColor() function call. Any glColor() function call following these two commands will result in the indicated color also applying to the front facing emissive material property.

At step 3 a glBegin (GL_LINES) command is received and the sequence generates a number of independent line primitives. As noted, this command specifies pairs of vertices interpreted as the end points of individual line segments. Line segments are drawn between $v_0$ and $v_1$, between $v_2$ and $v_3$, and so on.

At step 4 the command glColor ("blue") sets the currently effective color to blue. This also applies to the front facing emissive material property due to the commands at steps 1 and 2. Accordingly, at step 5 the front facing emissive global state is set equal to the color local state value of blue.

At step 6, the first glVertex() command is received for vertex v(0), which is rendered in the color blue. At step 7 the command glColor ("red") sets the currently effective color to red. The glColor() command is generated to cause the value of the color local state in the current geometry accelerator 120 change to red. Again, this is also applied to the front facing emissive material property due to the commands at steps 1 and 2. Thus, at step 8, the glMaterial() call for the front facing emissive material state is generated to cause the value of the front facing emissive global state in the current geometry accelerator 120 change to red.

At step 9, the next glVertex() command is received for vertex V(1), which is rendered in the color red. Between these two vertices a line primitive is drawn such as line primitive 303A illustrated in FIG. 3B. This is followed by a glEnd() command at step 10, completing this sequence of line primitives.

At step 11, the command glDisable (GL_COLOR_MATERIAL) is received from the host 100, removing the linking of the front facing emissive material state and the color state in the presently current and future current geometry accelerators. This is followed by another series of commands to render another series of line primitives.

At step 12 a glBegin (GL_LINES) command is received followed by a glVertex() command at step 13 for another vertex V(0), which is rendered in the currently-effective color of red. At step 14 another glVertex() command is received for a vertex V(1), which is also rendered in the color red. Between these two vertices a line primitive is drawn.

At step 15, the distributor 118 generates an EOC command to the geometry accelerators 120. As noted, the generation of the EOC command does not result in the rendering of a primitive by the geometry accelerators 120. Also, for the line primitive there is no shared vertex state or global state since there are no shared vertices and the global state values are provided to all the geometry accelerators 120. However, the local state is stored in the master state memory 420 whenever a new local state is received by the GA state controller 202 and the appropriate bits in the local state dirty vector 1104 are set to identify which geometry accelerators have this local state value.

As a result, although in step 15 the GA state controller 202 received a new vertex state, VS2, from the host 108, the coherency controller 402 prevents that vertex state from passing through the multiplexer 138. During this time, the EOC command is sent to the geometry accelerators 120 at step 15. In the new current geometry accelerator, the color local state will have some prior color value while the front facing emissive global state will have some prior color value. At step 16 the prior color local state value of red is resent to the new current geometry accelerator 120 casing the color local state value to change to red.

The new vertex state VS2 is then allowed to be forwarded to the geometry accelerators 120 by the coherency controller 402 at step 17. As shown, the new vertex VS(2) will be rendered by the new current geometry accelerator 120 with an unknown front emissive color rather than red which was established by the graphics application at step 8. This problem is alleviated by the present invention as described below.

As noted, the distributor 118 receives a stream of primitive data representative of graphics primitives from the driver on the host computer 108 over bus 110 and distributes the primitive data to the geometry accelerators 120 via the input bus 126. The driver on the host processor 108 provides an interface, preferably the OpenGL graphics API, to graphics applications on the host computer 108. As noted, in a preferred embodiment of the present invention, the geometry accelerator state controller 202 and distributor 118 are configured to operate in a graphics system 100 which provides the OpenGL API software interface. Such an interface is preferably supported by the driver, preferably embodies as a software program, residing on the host computer 108, which communicates with graphics applications on the host 108. A graphics application on the host computer 108 issues function calls or commands in accordance with the standard OpenGL API. The driver may convert the function call as required to communicate with the graphics hardware 100 and/or pass the API commands through to the graphics hardware 100.

In a preferred embodiment, portions of the present invention that control the linking of states is located in the driver residing on the host 108 and the state controller 202 residing in the distributor 118. In this embodiment, the driver responds to the API commands related to the linking of properties and controls the contents of registers in the state controller 202 to communicate the requisite information to enable the state controller 202 to properly distribute the global and local states to the geometry accelerators. The driver, based upon the glEnable() and the glColorMaterial() calls, sets register values in the state controller 202 to identify which material states are to be linked to the color local state and will cause the current color in the master local state registers 430 to be copied into any linked material state master global state registers 428 in the GA state controller 202. This simplifies the functions and operations that are to be performed in the state controller 202 and the geometry accelerators 120. In addition, this eliminates the need for additional hardware in either the state controller 202 or the accelerators 120.

The driver will also discard or filter glMaterial() calls for any material properties that are currently linked to glColor(). This is because, in accordance with the OpenGL API, when a state is linked, the linking is to take priority over a command to directly change the value of that linked state. The color of the material state cannot be independently changed after the linking is enabled. In a preferred embodiment, the driver simply filters these commands, thereby saving bandwidth to the distributor 118 as well as the expense of having to implement this functionality in hardware.

FIG. 2 illustrates one embodiment of the linked state registers. The linked state register 2200 identifies which material properties, if any, are linked to the color local state. In the current implementation of OpenGL, the geometry accelerators 120 may become dated with respect to the following material state items: specular, diffuse, emissive and ambient for both front facing and back facing. Accordingly, in this embodiment, there are six bits in the register 2200 which have encoded values that indicate the possible state linking. Two bits represent the front and back face while four bits represent the four material states of ambient, diffuse, specular and emissive. As noted, the contents of this register are preferably controlled by the driver located in the host 108.

To insure the graphics system 100 is current, the GA state controller 202 resends the geometry accelerators 120 any of the material states that have changed due to previously being linked with the color local state. The state controller 202 also updates the values of those same master global state registers 428 for the material states with that same color data. This eliminates any potential inconsistencies between geometry accelerators and insures the coherency of the geometry accelerators 120 and the state controller 202. Then, when a new color is received, the state controller 202 updates the values of the currently-linked material states as appropriate.

Specifically, the coherency controller 402 monitors the bus 110 via line 401 and receives the register writes which are received through the 3D pipeline from the driver. The linked state table 2200 is preferably maintained in the state registers 410. If there is a write to the linked state register 2200 the coherency controller 402 resends any material state that was linked. This determination is based upon the last registered value in the stored version of the linked state register 2200. This guarantees that every geometry accelerator 120 has the same, most recent values for the material states that were previously linked. This eliminates any concurrency errors that may have been introduced into the system due to the mapping of local and global states. This is insured by obtaining the color from the master color location which was the determining color for the material states which were linked.

The color master local state registers 430 are copied to any mapped material state master registers 428 based on the new mapping defined by the new register write command to the linked state register 2200 from the driver. This material state master change is based upon the new linkings to insure that if an EOC occurred after a color change which causes a linked material state to be resent in accordance with the present invention, the updated value rather than a previous value of the material states will be resent.

The coherency controller 402 updates linked state registers 2200 stored in the state registers 410 of the state controller 202 in accordance with the new linked state register writes provided by the driver. When a glColor() command is subsequently received, any master material state that is mapped to glColor() is updated based on the contents of the linked state register 2200. Thus, the master material property global state registers 428 are maintained by updating the linked material global states in accordance with any color value that is received.

Figure 23:
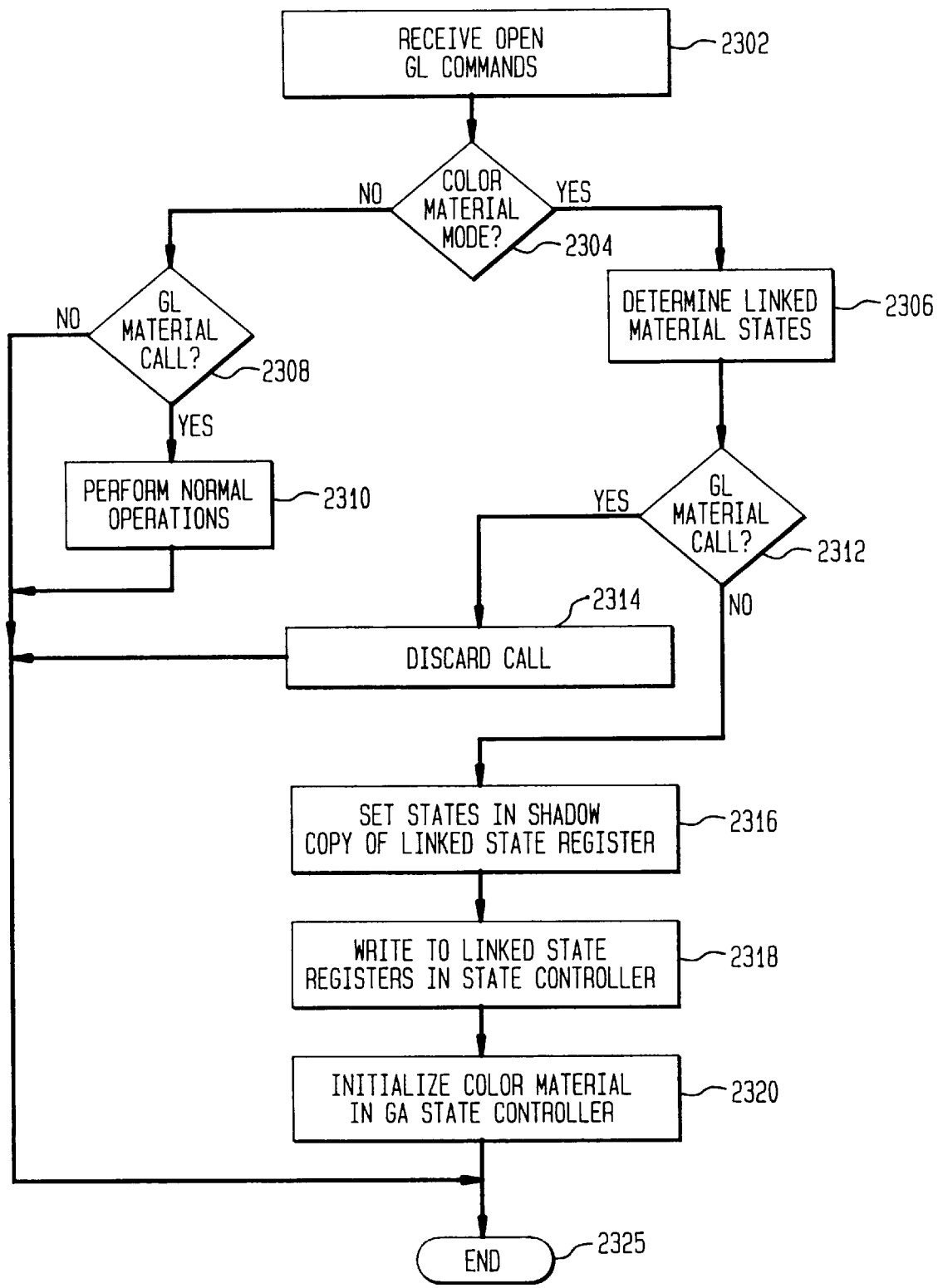
FIG. 23 is a flowchart of the process performed by the driver in the host computer to support the linking of local and global states.

The operations performed by the driver are described hereinbelow with reference to the flowchart shown in FIG. 23. The following description addresses the determination of whether a single material state is linked to color in accordance with the above preferred embodiments. However, as noted, in the exemplary embodiment of the OpenGL API, the material states are front and back ambient, diffuse, ambient, emission and specular. It is considered to be apparent to those skilled in the art that the following procedures may be repeated where necessary to address all such material states. Furthermore, it should be understood that these particular states are for the current implementation of the OpenGL API and are, therefore, provided as one illustrative embodiment. Other states, local and global, may be considered where necessary to accommodate the linking provided by the implemented API.

At block 2302 the driver receives the OpenGL commands through the OpenGL API. At block 2304 the driver determines whether the color material mode of operation has been invoked by the graphics application. As noted, the OpenGL API requires the presence of two commands, the glColorMaterial() and the glEnable(gl_Color_Material) command for the linking of the material property and color to be enabled. Also, for each material state that may be linked to color, such linking may occur due to the receipt of the glColorMaterial() command expressly identifying which material states are to be currently linked to color. In addition, the material states may be linked by default in accordance with the API. Thus, at block 2304, the driver considers these two possible conditions to determine whether the material state is linked to the color local state.

If the color material mode of operation has been enabled by the graphics application, then at block 2306 the driver must determine which material states, if any, are bound to the color local state. This is determined by looking at the parameters of the function calls wherein the user specifies which material states are desired to be linked to the color local state.

If the color material mode of operation has not been enabled, then a determination is made as to whether a glMaterial() function call has been made at block 2308. If so, then the material states may be altered directly by the user and processing proceeds as normal at block 2310 as described above. If not, then processing ceases at end bloc 2325.

At block 2312 the driver determiners whether a material command that attempts to change the value of the linked material property has been received. If so, then the command is discarded by the driver at block 2314. If not, then at block 2316 the driver sets the states in a shadow copy of the state link register 2200 located in local memory in the host processor 108. At block 2318, the driver writes to the appropriate bits to the state link register 2300 in the state controller 202. Once this register is updated, the state controller 202 is then capable of supporting any color changes through the updating of the appropriate graphics state memory registers for the appropriate material properties.

At block 2320 the driver initializes the material properties in the state controller 202. In one embodiment, the driver writes to R, G, B and inherit registers in the state registers 410 to trigger the state controller 202 to copy the color value to any mapped material master state registers 420 in the graphics state memory 414. Processing then ceases at block 2325.

Figure 24:
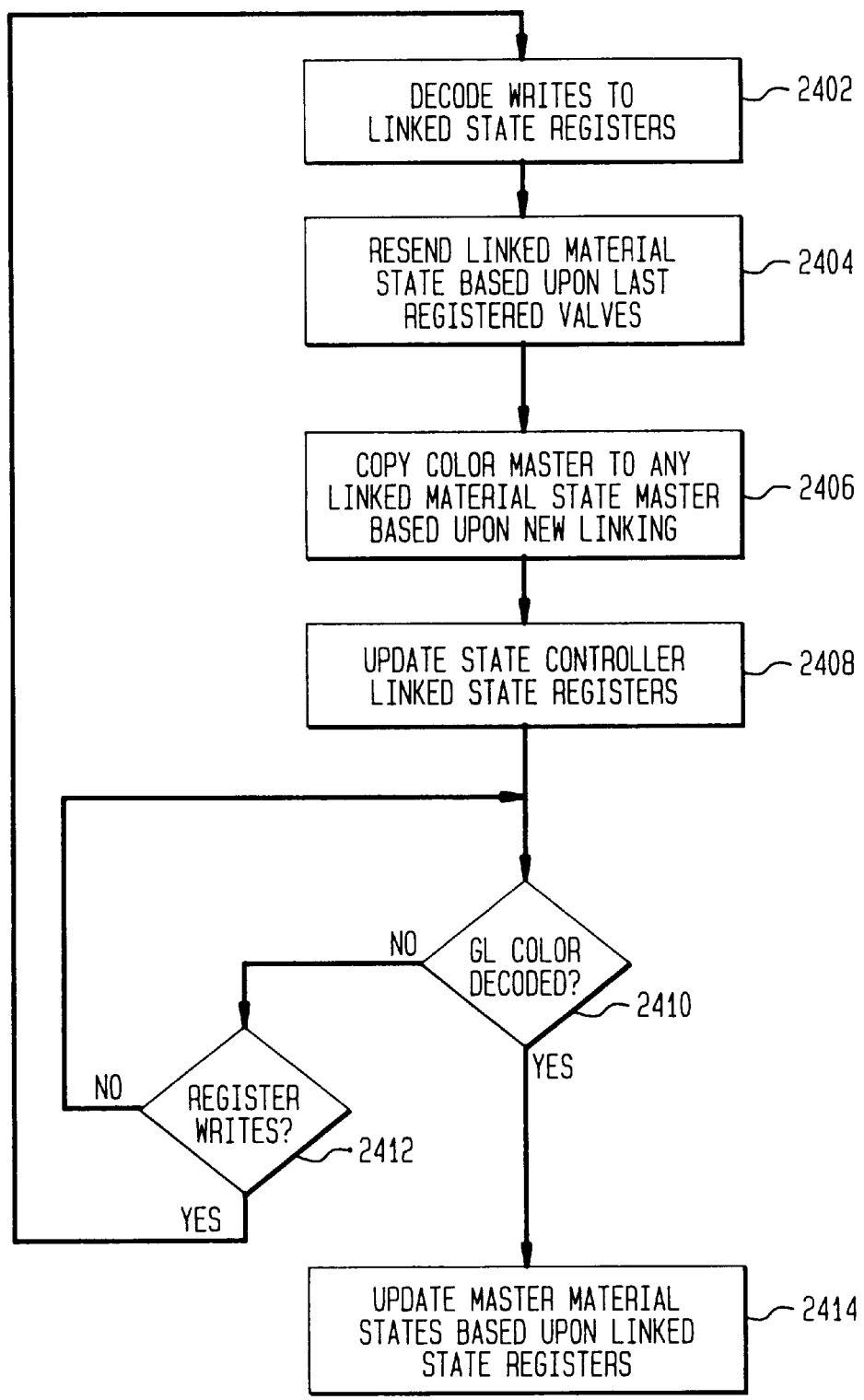
FIG. 24 is a flowchart of the operations performed by the GA state controller 202 to manage linked states in accordance with the present invention.

A flowchart of the operations performed by the state controller 202 is shown in FIG. 24. As noted, the coherency controller 402 in the GA state controller 202 monitors the bus 110 via line 401. The driver sends the writes to the linked state register 2200 over bus 110. At block 2402 the coherency controller 402 decodes these register writes and updates the linked state registers 2200 maintained in the state registers 410. If there is a write to the linked state register 2200 then the contents of the register is updated and the bits are accessed to determine what has been changed by the driver.

At block 2404 the coherency controller 402 resends any material state that was previously linked based on the last registered values in the linked state registers 2200. These global states are send to the geometry accelerators 120 upon receipt of new linked state register 22000 values to explicitly insure that every geometry accelerator 120 is current; that is, that every geometry accelerator 120 has the same, most recent values for the material states that were previously linked. This eliminates any concurrency errors that may have been introduced into the system due to the prior linkings of local and global states. This is insured by obtaining the color from the master color location in the master local state registers 420 which was the determining color for those material states which were linked. Thus, prior to attending to the new linking of states, all of the geometry accelerators 120 are placed in synch with anything that happened as a result of the old linkings.

At block 2406 the color master global state registers 428 is copied to any mapped material state master registers 428 based on the new mapping defined by the new write to the linked state register 2200. This operation may include either 1, 2 or 4 sets of R, G and B (and alpha) registers, depending upon the material properties that are linked.

This operation is performed in response to the driver operation noted at block 2220 whereat the driver initializes the GS state controller 202. As noted, this is achieved by the driver writing to the R, G, B and A inherent registers, which are also located in state registers 410. These registers are written from the driver after all writes to the linked state registers 2200. These writes cause the coherency controller 402 to copy the master color value into any and all linked material state master register locations 428 in accordance with the newly received linkings. This operation is performed regardless of whether a function call for a new color has been received. Whatever the last color that was sent, even if it was sent before the new linking is received, is applied to anything that is mapped based on this new linking. This insures that if an EOC occurred after a color change that causes a linked material state to be resent in accordance with the present invention, the updated value of the material states will be resent.

At block 2408 the linked state registers 2200 stored in the state registers 410 of the state controller 202 are updated in accordance with the new linked state register writes provided by the driver. The state controller 202 is then ready to be responsive to color value changes.

At block 2410 the coherency controller 402 determines when a glColor() has been decoded. If there is no glColor() command, then either processing is suspended until such a function call is received or until additional register writes are received from the driver, a shown by block 2412.

When a glColor() command is received and decoded then processing continues at block 2414 whereat any master material state that is mapped to glColor() is updated based on the registered version of linked state register 2200 stored in the GA state controller 202. Thus, the master material state registers 428 are maintained by updating the linked material global states in accordance with any color value that is received. These state values are then provided to the geometry accelerators 120 in accordance with the above-noted techniques.

Throughout the above process, if diffuse is one of the mapped color material states and alpha is not valid, then the coherency controller 402 sends a value of 1.0 for alpha.

As noted, it is preferable that the driver filters the glMaterial commands and discards them when the glColorMaterial function is enabled. Alternatively, this filtering may be performed by the state controller 202. However, it is preferable that the software perform the filtering because the linking of the global and local states is relatively rare, and does not warrant dedicated hardware to perform such a function. In alternative embodiments, the tradeoff between hardware complexity and software performance may dictate placing such functionality in hardware.

Advantageously, the present invention minimizes the bandwidth associated with the linking of local and global states with a single write command to a register in the geometry accelerators.

There are significant benefits to this approach as compared to providing all of the primitive data to all of the geometry accelerators. Such an approach would result in filling the input buffers of the geometry accelerators with a significant amount of unnecessary data, and would likely require larger FIFOs that currently necessary. As a result, as noted above, local states include those states that are often altered during the rendering of a scene.

While various embodiments of the present invention have been described above, it should be understood that they have been presented by way of example only, and not limitation. Thus, the breadth and scope of the present invention are not limited by any of the above-described exemplary embodiments, but are defined only in accordance with the following claims and their equivalents.

What is claimed is:

1. A computer graphics system for rendering graphics primitives based upon primitive data, including vertex states and property states, received from a host computer through a graphics interface, the system comprising:

a plurality of geometry accelerators configured to process the primitive data to render graphics primitives from one or more vertex states in accordance with the property states currently-maintained in each said geometry accelerator;

a distributor configured to divide the primitive data into chunks of primitive data and to distribute each of said chunks of primitive data to a current geometry accelerator recipient including, a state controller, interposed between the host computer and said plurality of geometry accelerators, configured to send primitive data to said plurality of geometry accelerators; and a driver configured to control said state controller to set a value of a dependent property state to a value of a determining property state and to forward said value of said dependent property state to one or more of said plurality of geometry accelerators.

2. The system of claim 1, wherein said driver controls said state controller upon an occurrence of function calls causing said dependent property state to have a value determined by said value assigned to said determining property state.

3. The system of claim 1, wherein the driver controls distribution of said property state values through writes to a linked state register stored in said state controller, wherein said linked state register identifies which property states are said dependent property states and which of said property states are said determining property states.

4. The system of claim 1, wherein the driver is located on the host computer and provides a standardized interface to graphics applications on the host computer.

5. The system of claim 1, wherein said state controller resends to said plurality of the geometry accelerators said dependent property states that have changed due to being linked with a previous determining property state, and wherein said state controller updates said values of said dependent property states with said values of said determining property state.

6. The system of claim 1, wherein said driver discards function calls to change currently dependent properties.

7. The system of claim 1, wherein said state controller logically divides said property states into one or more categories according to a frequency at which said values of said property states are changed by said host computer.

8. The system of claim 7, wherein said property states categories comprise:

local states including those property states which are changed often; and global states including those property states which are changed rarely.

9. A computer graphics system for rendering graphics primitives based upon primitive data, including vertex states and property states, received from a host computer through a graphics interface, the system comprising:

a plurality of geometry accelerators configured to process the primitive data to render graphics primitives from one or more vertex states in accordance with the property states currently-maintained in each said geometry accelerator;

a distributor configured to divide the primitive data into chunks of primitive data and to distribute each of said chunks of primitive data to a current geometry accelerator recipient including, a state controller, interposed between the host computer and said plurality of geometry accelerators, configured to send primitive data to said plurality of geometry accelerators; and driver means for controlling said state controller to set a value of a dependent property state to a value of a determining property state and for forwarding said value of said dependent property state to one or more of said plurality of geometry accelerators, wherein the driver controls distribution of said property state values through writes to a linked state register stored in said state controller, and wherein said linked state register identifies which property states are said dependent property states and which of said property states are said determining property states.

10. The system of claim 9, wherein said driver controls said state controller upon an occurrence of function calls causing said dependent property state to have a value determined by said value assigned to said determining property state.

11. The system of claim 10, wherein the driver is located on the host computer and provides a standardized interface to graphics applications on the host computer.

12. The system of claim 11, wherein said state controller resends to said plurality of the geometry accelerators said dependent property states that have changed due to being linked with a previous determining property state, and wherein said state controller updates said values of said dependent property states with said values of said determining property state.

13. A method for rendering graphics primitives based upon primitive data, including vertex states and property states, received from a host computer through a graphics interface, in a computer graphics system comprising the steps of:

(a) receiving primitive data from the host computer;

(b) dividing said primitive data into chunks of primitive data;

(c) distributing each of said chunks of primitive data to a current geometry accelerator recipient;

(d) processing said primitive data to render graphics primitives from one or more vertex states in accordance with said property states currently-maintained in each said geometry accelerator; and (e) distributing values of a determining property state to one or more of the geometry accelerators for a value of a depending property state which depends from the determining property state.

14. The method of claim 13, wherein said step (e) comprises the steps of:

(1) determining whether a linked state mode of operation has been invoked by a graphics application;

(2) determining which property state is the determining property state and which property state is a dependent property state; and (3) forwarding values of the determining property state to the geometry accelerators for the values of the dependent property states.

15. The method of claim 14, wherein said step (e)(2) comprises the steps of:

a) resending previously-linked dependent state values with the value of the determining property state;

b) copying to any dependent property state master registers based on the linking established in step (e)(1); and c) updating the linked state register in accordance with the linking established in step (e)(1).

16. The method of claim 14, further comprising the step of:

(f) updating the dependent property state based upon the contents of the linked state register when the value of the determining property value is changed.

17. The method of claim 14, further comprising the step of:

(g) filtering requests to directly change the value of the dependent state.

18. The method of claim 13, further comprising the steps of:

(f) performing a register write operation to a linked state register in the state controller to identify the dependent property states and the determining property states.

19. A method for rendering graphics primitives based upon primitive data, including vertex states and property states, received from a host computer through a graphics interface, in a computer graphics system comprising the steps of:

(a) distributing chunks of primitive data to a current geometry accelerator recipient;

(b) processing said primitive data to render graphics primitives from one or more vertex states in accordance with said property states currently-maintained in each said geometry accelerator;

(c) distributing values of a determining property state to one or more of the geometry accelerators for a value of a depending property state which depends from the determining property state;

(d) updating the dependent property state based upon the contents of the linked state register when the value of the determining property value is changed.

20. The method of claim 19, wherein said step (c) comprises the steps of:

(1) determining whether a linked state mode of operation has been invoked by a graphics application;

(2) determining which property state is the determining property state and which property state is a dependent property state, including, a) resending previously-linked dependent state values with the value of the determining property state, b) copying to any dependent property state master registers based on the linking established in step (c), and c) updating the linked state register in accordance with the linking established in step (c); and (3) forwarding values of the determining property state to the geometry accelerators for the values of the dependent property states.

* * * * *